United States Patent
Kim et al.

(10) Patent No.: US 9,919,611 B2
(45) Date of Patent: Mar. 20, 2018

(54) VEHICLE CHARGE ASSISTANCE DEVICE AND VEHICLE INCLUDING THE SAME

(71) Applicant: LG ELECTRONICS INC., Seoul (KR)

(72) Inventors: Sungmin Kim, Seoul (KR); Jaesung Lee, Seoul (KR); Jonghun Song, Seoul (KR); Younsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 306 days.

(21) Appl. No.: 14/671,674

(22) Filed: Mar. 27, 2015

(65) Prior Publication Data

US 2015/0343916 A1    Dec. 3, 2015

(30) Foreign Application Priority Data

Jun. 3, 2014   (KR) .................... 10-2014-0067892

(51) Int. Cl.
*B60L 9/00* (2006.01)
*B60L 11/18* (2006.01)
*B62D 15/02* (2006.01)

(52) U.S. Cl.
CPC ......... *B60L 11/1835* (2013.01); *B60L 11/182* (2013.01); *B62D 15/028* (2013.01); *B60L 2250/16* (2013.01); *Y02T 10/7005* (2013.01); *Y02T 10/7072* (2013.01); *Y02T 90/12* (2013.01); *Y02T 90/121* (2013.01); *Y02T 90/122* (2013.01);

(Continued)

(58) Field of Classification Search
CPC ... Y02T 90/121; Y02T 90/14; Y02T 10/7005; Y02T 90/122; Y02T 10/7072; Y02T 90/125

See application file for complete search history.

(56) References Cited

U.S. PATENT DOCUMENTS 8,483,899 B2   7/2013   Martin
8,513,915 B2   8/2013   Patel
(Continued)

FOREIGN PATENT DOCUMENTS

CN   10-2209647   10/2011
CN   10-3171552    6/2013
(Continued)

OTHER PUBLICATIONS

Korean Office Action issued in Application No. 10-2014-0067892 dated May 21, 2015.
(Continued)

*Primary Examiner* — Redhwan K Mawari
(74) *Attorney, Agent, or Firm* — Ked & Associates, LLP

(57) ABSTRACT

A vehicle charge assistance device and a vehicle including the same are disclosed. The vehicle charge assistance device includes at least one camera mounted on a vehicle, an antenna to detect a magnetic field from a charging device, and a processor to control movement of the vehicle. The processor may generate a vehicle movement direction signal based on an object associated with the charging device in an image from the at least one camera and generate a guide signal to adjust a position of the vehicle based on the magnetic field after movement of the vehicle according to the vehicle movement direction signal. Consequently, it is possible to easily and conveniently move the vehicle to the charge system.

13 Claims, 21 Drawing Sheets

(52) U.S. Cl.
CPC .............. *Y02T 90/125* (2013.01); *Y02T 90/14* (2013.01); *Y10S 903/903* (2013.01)

(56) References Cited

U.S. PATENT DOCUMENTS

| | | | | |
|---|---|---|---|---|
| 2002/0049630 | A1* | 4/2002 | Furuta | G01C 21/26 705/13 |
| 2003/0189498 | A1* | 10/2003 | Kakihara | G06Q 30/0284 340/928 |
| 2010/0201204 | A1* | 8/2010 | Sakoda | H02J 5/005 307/104 |
| 2011/0082612 | A1* | 4/2011 | Ichikawa | B60L 11/182 701/22 |
| 2011/0254503 | A1* | 10/2011 | Widmer | B60L 11/182 320/108 |
| 2011/0279226 | A1* | 11/2011 | Chen | B60L 11/182 340/5.8 |
| 2012/0098483 | A1* | 4/2012 | Patel | B60L 11/182 320/108 |
| 2013/0162825 | A1* | 6/2013 | Yoon | B60W 30/06 348/148 |
| 2013/0249303 | A1* | 9/2013 | Keeling | H01F 27/022 307/104 |
| 2014/0002019 | A1* | 1/2014 | Park | B60L 11/00 320/109 |
| 2014/0111152 | A1* | 4/2014 | Kai | B60L 11/182 320/108 |
| 2015/0061897 | A1* | 3/2015 | Kees | B60L 11/1846 340/932.2 |

FOREIGN PATENT DOCUMENTS

| | | |
|---|---|---|
| CN | 103336268 A * | 10/2013 |
| FR | 2 981 626 A1 | 4/2013 |
| JP | 2010-057286 A | 3/2010 |
| JP | 2013-046482 A | 3/2013 |
| KR | 10-2012-0067366 A | 6/2012 |
| KR | 10-2013-0037274 A | 4/2013 |
| WO | WO 2013/051801 | 4/2013 |

OTHER PUBLICATIONS

European Search Report dated Jan. 28, 2016 issued in Application No. 15001640.0.
Chinese Office Action dated May 4, 2017 issued in Application No. 201510295564.7 (English translation attached).

\* cited by examiner

VEHICLE CHARGE ASSISTANCE DEVICE AND VEHICLE INCLUDING THE SAME

CROSS-REFERENCE TO RELATED APPLICATION

This application claims priority under 35 U.S.C. § 119 to Korean Patent Application No. 10-2014-0067892, filed on Jun. 3, 2014, whose entire disclosure is hereby incorporated by reference.

BACKGROUND

1. Field

The present disclosure relates to a vehicle charge assistance device and a vehicle including the same and, more particularly, to a vehicle charge assistance device that enables a vehicle to easily and conveniently move to a charge system and a vehicle including the same.

2. Background

A vehicle in a broad sense is a device that allows a driver to move in a desired direction. A representative example of the vehicle may be a car. In order to improve convenience of a user who uses the vehicle, the vehicle may be equipped with various sensors and electronic devices. In particular, various devices to improve driving convenience of the user have been developed. An image photographed by a rear view camera may be provided while the vehicle moves backward or when parking the vehicle.

BRIEF DESCRIPTION OF THE DRAWINGS

The embodiments will be described in detail with reference to the following drawings in which like reference numerals refer to like elements wherein.

DETAILED DESCRIPTION

Exemplary embodiments of the present disclosure will be described with reference to the attached drawings.

The terms "module" and "unit," when attached to the names of components are used herein to help the understanding of the components and thus they should not be considered as having specific meanings or roles. Accordingly, the terms "module" and "unit" may be used interchangeably.

It is an object of the present disclosure to provide a vehicle charge assistance device that enables a vehicle to easily and conveniently move to a charge system and a vehicle including the same.

It is another object of the present disclosure to provide a vehicle charge assistance device that is capable of adjusting the position of a vehicle based on a magnetic field from a charge system after the vehicle is moved based on an image and a vehicle including the same.

A vehicle as described in this specification may include a car, a motorcycle or another appropriate mode of transportation. Hereinafter, a description will be given based on a car simply for ease of discussion.

A vehicle as described in this specification may be a vehicle that includes a battery to power an electric motor. For example, the vehicle may include a vehicle having an engine as a power source, a hybrid vehicle having an engine and an electric motor as a power source, or an electric vehicle having an electric motor as a power source.

Meanwhile, a vehicle charge assistance device as described in this specification may be a device, including a plurality of cameras, which may generate a vehicle movement direction signal to move a vehicle to a charge system based on a plurality of images photographed by the cameras and generates a guide signal to adjust the position of the vehicle based on a magnetic field from the charge system received by an antenna. Consequently, the vehicle may easily and conveniently move to the charge system.

Moreover, a vehicle charge assistance device as described in this specification may combine a plurality of images photographed by a plurality of cameras to generate an around view image. In particular, the vehicle charge assistance device may be a vehicle-based device that provides a top view or a bird's eye view. Hereinafter, a description will be given of various embodiments of a vehicle charge assistance device according to the present disclosure and a vehicle including the same.

Figure 1:
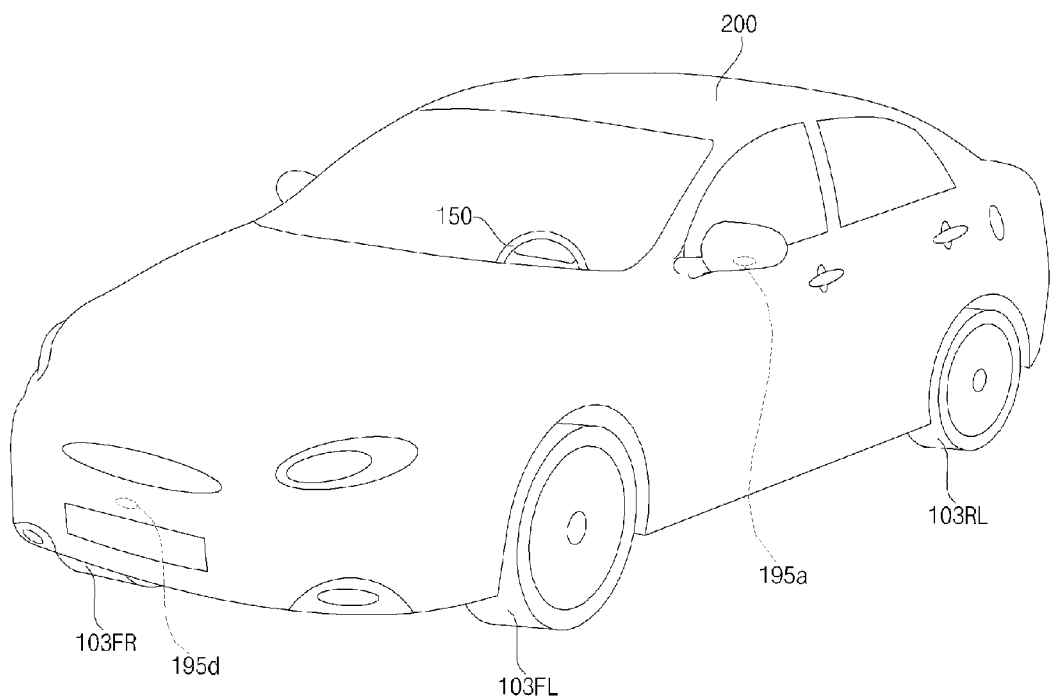
FIG. 1 is a view showing the external appearance of a vehicle having around view cameras according to an embodiment of the present disclosure.

FIG. 1 is a view showing the external appearance of a vehicle having around view cameras according to an embodiment of the present disclosure. A vehicle 200 may include wheels 103FR, 103FL, 103RL, etc., a steering wheel 150, and a plurality of around view cameras 195a, 195b, 195c, and 195d mounted on the vehicle 200. In FIG. 1, there are shown only a left side view camera 195a and a front view camera 195d for the sake of convenience.

When the vehicle moves forward at a predetermined speed or less, or when the vehicle moves backward, the around view cameras 195a, 195b, 195c, and 195d may be activated to acquire images. The images acquired by the cameras may be signal-processed by a vehicle charge assistance device 100 (see FIG. 3A or 3B).

Figure 2A:
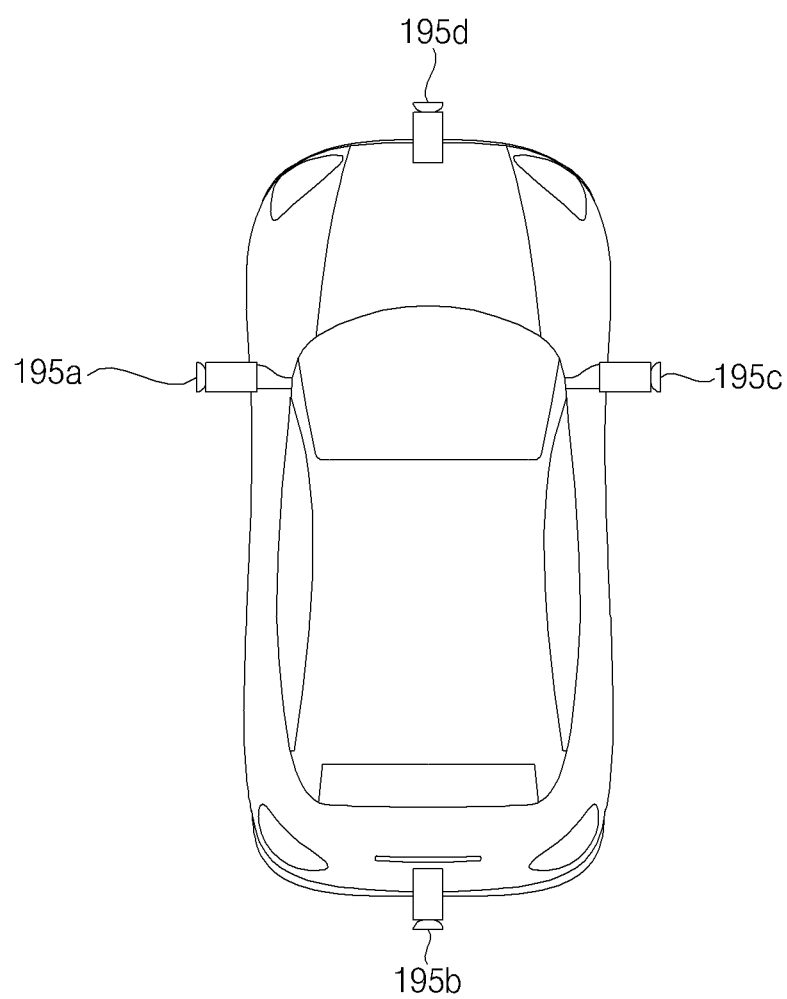
FIG. 2A is a view schematically showing positions of the around view cameras attached to the vehicle shown in FIG. 1.
Figure 2B:
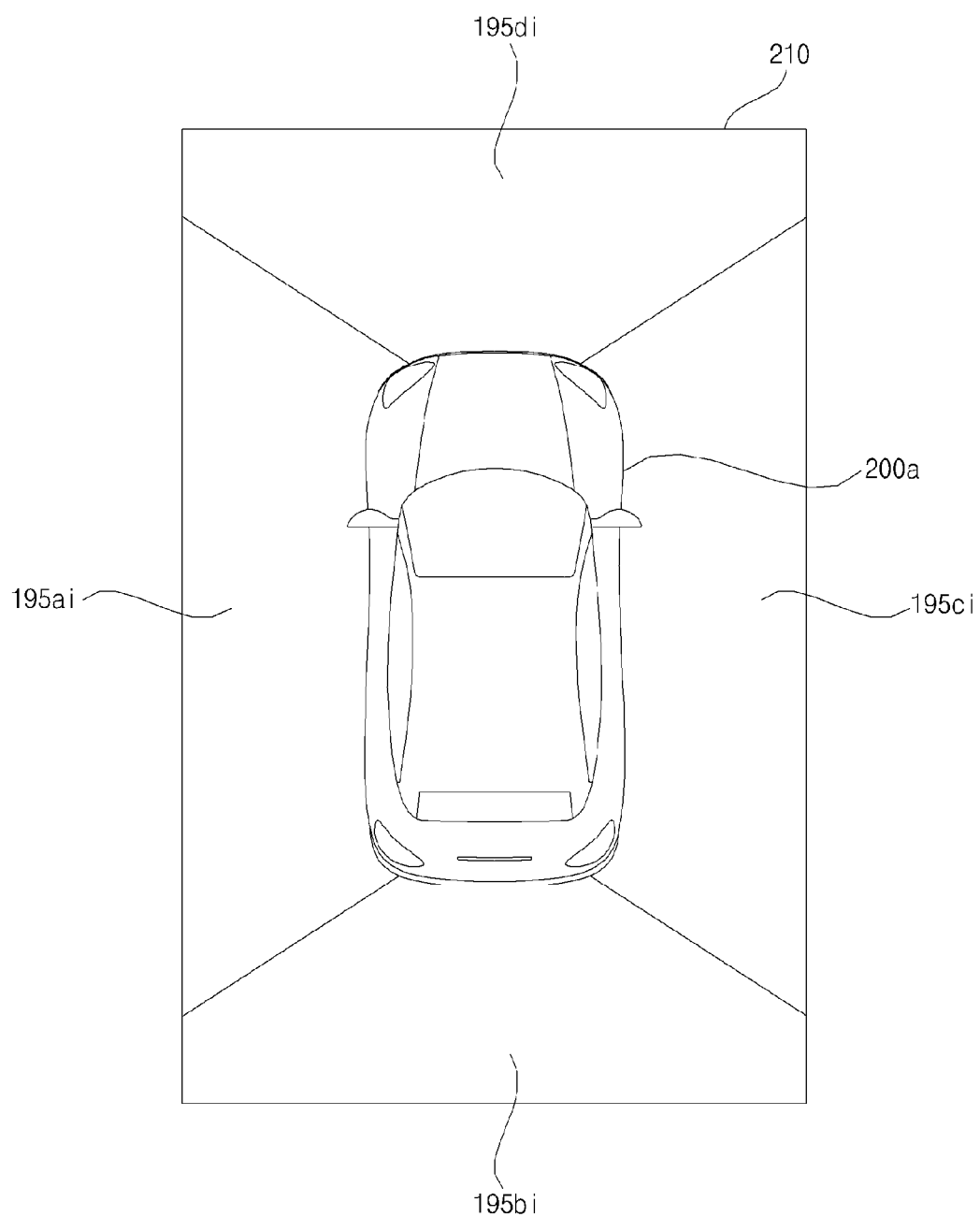
FIG. 2B is a view showing an around view image based on images photographed by the around view cameras of FIG. 2A.

FIG. 2A is a view showing positions of the around view cameras attached to the vehicle shown in FIG. 1, and FIG. 2B is a view showing an around view image based on images photographed by the around view cameras of FIG. 2A. The around view cameras 195a, 195b, 195c, and 195d may be disposed at the left side, the rear, the right side, and the front of the vehicle, respectively. In particular, the left side view camera 195a and the right side view camera 195c may be disposed in a case (or housing) surrounding a left side view mirror and a case surrounding a right side view mirror, respectively. On the other hand, the rear view camera 195b and the front view camera 195d may be disposed at a rear side of the vehicle, e.g., around a trunk switch, and at a front side of the vehicle, e.g., at an emblem or around the emblem, respectively.

A plurality of images photographed by the around view cameras 195a, 195b, 195c, and 195d may be transmitted to a processor 170 (see FIG. 3A or 3B) in the vehicle 200. The processor 170 may combine the images to generate an around view image.

FIG. 2B shows an example of an around view image 210. The around view image 210 may include a first image region 195ai from the left side view camera 195a, a second image region 195bi from the rear view camera 195b, a third image region 195ci from the right side view camera 195c, and a fourth image region 195di from the front view camera 195d. The around view image 210 may include an image representing the vehicle, and may be provided as a bird's eye view image.

Figure 3A:
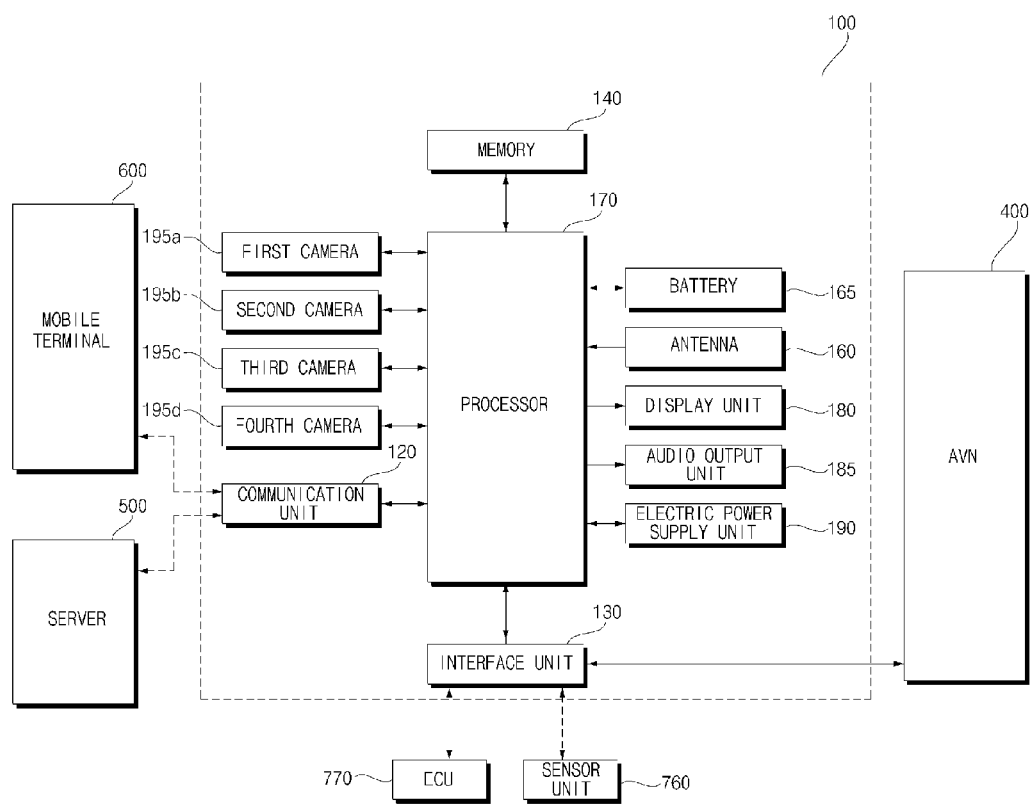
FIGS. 3A and 3B are internal block diagrams showing various examples of a vehicle charge assistance device according to an embodiment of the present disclosure.
Figure 3B:
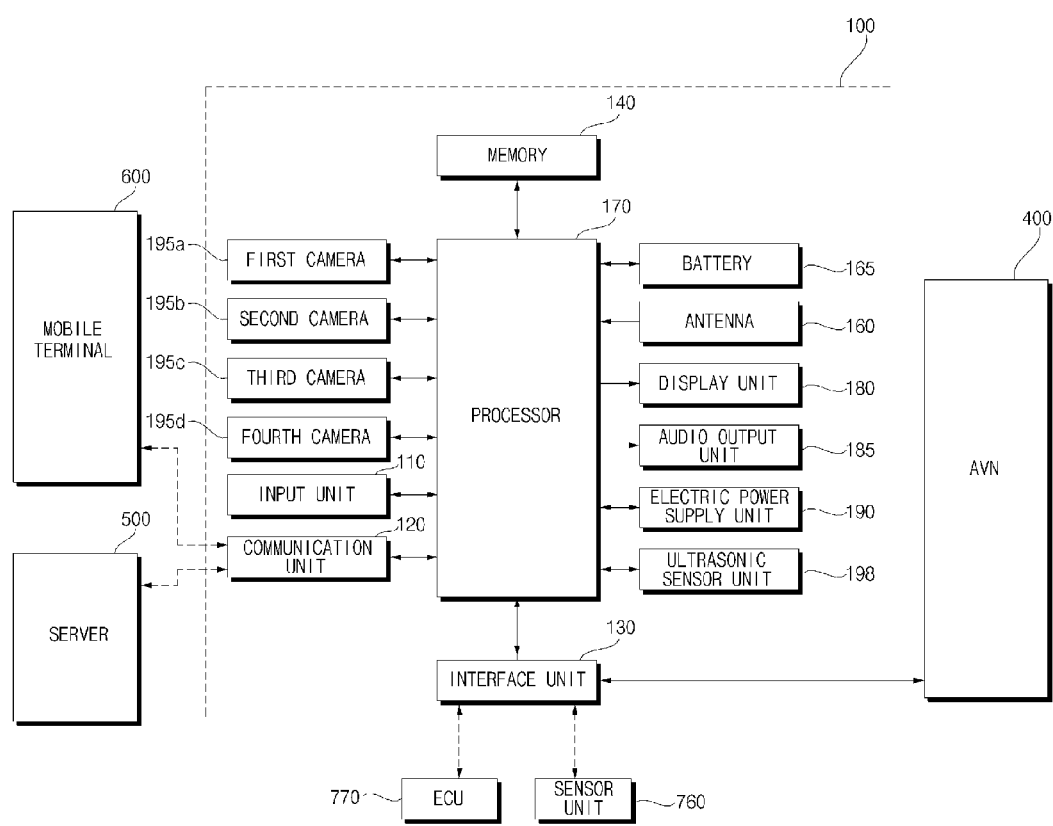

FIGS. 3A and 3B are internal block diagrams showing various examples of a vehicle charge assistance device according to an embodiment of the present disclosure. A vehicle charge assistance device 100 shown in FIGS. 3A and 3B may include a plurality of cameras 195a, 195b, 195c, and 195d. The vehicle charge assistance device 100 may generate a vehicle movement direction signal to move a vehicle to a charge system 800 (see FIGS. 8A to 8D) based on a plurality of images photographed by the cameras 195a, 195b, 195c, and 195d and generate a guide signal to adjust the position of the vehicle based on a magnetic field 810 from the charge system 800 received by an antenna 160. In certain embodiments, one or more than one antenna 160 may be provided.

The vehicle charge assistance device 100 shown in FIGS. 3A and 3B may combine a plurality of images photographed by the cameras 195a, 195b, 195c, and 195d to generate an around view image. Moreover, the vehicle charge assistance device 100 may detect, verify, and track an object for a view around the vehicle based on a plurality of images photographed by the cameras 195a, 195b, 195c, and 195d.

Referring first to FIG. 3A, the vehicle charge assistance device 100 may include a communication unit 120, an interface unit 130, a memory 140, an antenna 160, a battery 165, a processor 170, a display unit 180, an audio output unit 185, an electric power supply unit 190, and a plurality of around view cameras 195a, 195b, 195c, and 195d. In addition, the vehicle charge assistance device 100 may further include an audio input unit (not shown).

The communication unit 120 may exchange data with a mobile terminal 600 or a server 500 in a wireless fashion. In particular, the communication unit 120 may exchange data with a mobile terminal of the driver in a wireless fashion. To this end, various wireless data communication protocols, such as Bluetooth, Wi-Fi, Wi-Fi Direct, and APiX, may be used.

The communication unit 120 may receive weather information and road traffic state information, such as Transport Protocol Expert Group (TPEG) information, from the mobile terminal 600 or the server 500. On the other hand, the communication unit 120 may transmit real-time traffic information acquired by the vehicle charge assistance device 100 based on images to the mobile terminal 600 or the server 500. When a user gets into the vehicle, a mobile terminal 600 of the user may pair with the vehicle charge assistance device 100 automatically or by the user executing an application.

The interface unit 130 may receive vehicle-related data or transmit a signal processed or generated by the processor 170 to the outside. To this end, the interface unit 130 may perform data communication with an electronic control unit (ECU) 770, an audio and video navigation (AVN) apparatus 400, and a sensor unit 760 in the vehicle in a wired communication fashion or a wireless communication fashion. The interface unit 130 may receive map information related to vehicle travel through data communication with the AVN apparatus 400.

On the other hand, the interface unit 130 may receive sensor information from the ECU 770 and the sensor unit 760. The sensor information may include at least one selected from among vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, and in-vehicle humidity information, or the like.

Of the above-specified sensor information, the vehicle heading information, the vehicle position information, the vehicle angle information, the vehicle speed information, and the vehicle tilt information, which are related to vehicle travel, may be referred to herein as vehicle travel information.

The memory 140 may store various data for overall operation of the vehicle charge assistance device 100, such as programs for processing or control of the processor 170. Moreover, the antenna 160 may receive a magnetic field 810 from the charge system 800. In addition, the antenna 160 may transmit information regarding the received magnetic field, such as information regarding intensity and direction of the magnetic field, to the processor 170. When the movement of the vehicle to the charge system 800 is completed, the battery 165 may be wirelessly charged with electric energy from the charge system 800.

The audio input unit may receive a user's voice. To this end, the audio input unit may include a microphone. The received voice may be converted into an electric signal, which may be transmitted to the processor 170.

The processor 170 may control overall operation of each unit in the vehicle charge assistance device 100. In particular, the processor 170 may generate a vehicle movement direction signal to move the vehicle to the charge system 800 based on a plurality of images photographed by the cameras 195a, 195b, 195c, and 195d, and may generate a guide signal to adjust the position of the vehicle based on the magnetic field 810 from the charge system 800 received by the antenna 160.

Specifically, the processor 170 may acquire a plurality of images photographed by the cameras 195a, 195b, 195c, and 195d and signal-process the acquired images based on computer vision. In addition, the processor 170 may detect an object in the images and continuously track motion of the object after detection of the object.

In particular, the processor 170 may detect, verify, and track a charge-related object in the images. In addition, the processor 170 may generate a vehicle movement direction signal corresponding to the detected and verified charge-related object.

On the other hand, in a case in which the antenna 160 receives a magnetic field 810 having predetermined intensity or more after movement of the vehicle, the processor 170 may generate a guide signal to adjust the position of the vehicle using information regarding intensity and direction of the received magnetic field 810.

Meanwhile, the processor 170 may acquire a plurality of images from the cameras 195a, 195b, 195c, and 195d and combine the acquired images to generate an around view image. For example, the processor 170 may calculate disparity for a view around the vehicle based on the acquired images or the generated around view image, detect an object in the image based on calculated disparity information, and continuously track motion of the object after detection of the object. Disparity information is described in further detail with reference to FIGS. 4A and 4B hereinafter.

In particular, during detection of the object, the processor 170 may perform lane detection, adjacent vehicle detection, pedestrian detection, road surface detection, or another appropriate type of object detection. In addition, the processor 170 may calculate the distance to the detected adjacent vehicle or the detected pedestrian.

On the other hand, the processor 170 may receive sensor information from the ECU 770 or the sensor unit 760 through the interface unit 130. The sensor information may include at least one selected from among vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, and in-vehicle humidity information, or the like.

The display unit 180 may display the around view image generated by the processor 170. During display of the around view image, the display unit 180 may provide various user interfaces. In addition, the display unit 180 may include a touch sensor to sense a touch input to each user interface.

Meanwhile, the display unit 180 may include a cluster or a head up display (HUD) provided at the inside front of the vehicle. In a case in which the display unit 180 is the HUD, the display unit 180 may include a projection module to project an image on the front windshield of the vehicle 200.

The audio output unit 185 may output a sound based on an audio signal processed by the processor 170 to the outside. To this end, the audio output unit 185 may include at least one speaker.

The electric power supply unit 190 may supply electric power to the respective components under control of the processor 170. In particular, electric power from an in-vehicle battery may be supplied to the electric power supply unit 190.

The cameras 195*a*, 195*b*, 195*c*, and 195*d* may be cameras configured to provide an around view image. The cameras 195*a*, 195*b*, 195*c*, and 195*d* may be wide-angle cameras.

Referring now to FIG. 3B, the vehicle charge assistance device 100 of FIG. 3B is similar to the vehicle charge assistance device 100 of FIG. 3A except that the vehicle charge assistance device 100 of FIG. 3B further includes an input unit 110 and an ultrasonic sensor unit 198. Hereinafter, simply for convenience a description will be given of only the input unit 110 and the ultrasonic sensor unit 198.

The input unit 110 may include a plurality of buttons attached around the display unit 180 or a touchscreen disposed on the display unit 180. The vehicle charge assistance device 100 may be powered on through the buttons or the touchscreen such that the vehicle charge assistance device 100 can be operated. On the other hand, various input operations may be performed through the input unit 110.

The ultrasonic sensor unit 198 may include a plurality of ultrasonic sensors. In a case in which the ultrasonic sensors are mounted in the vehicle, the ultrasonic sensor unit 198 may sense an object around the vehicle based on a difference between transmitted ultrasonic waves and received ultrasonic waves.

In one embodiment, Light Detection And Ranging (LiDAR) (not shown) may be provided instead of the ultrasonic sensor unit 198. Alternatively, both the ultrasonic sensor unit 198 and the LiDAR may be provided.

Figure 4A:
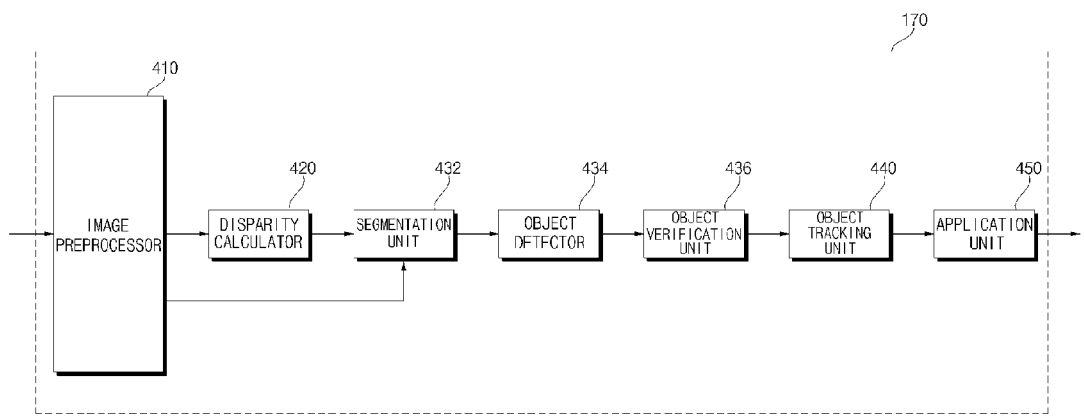
FIGS. 4A and 4B are internal block diagrams showing various examples of a processor shown in FIGS. 3A and 3B.
Figure 4B:
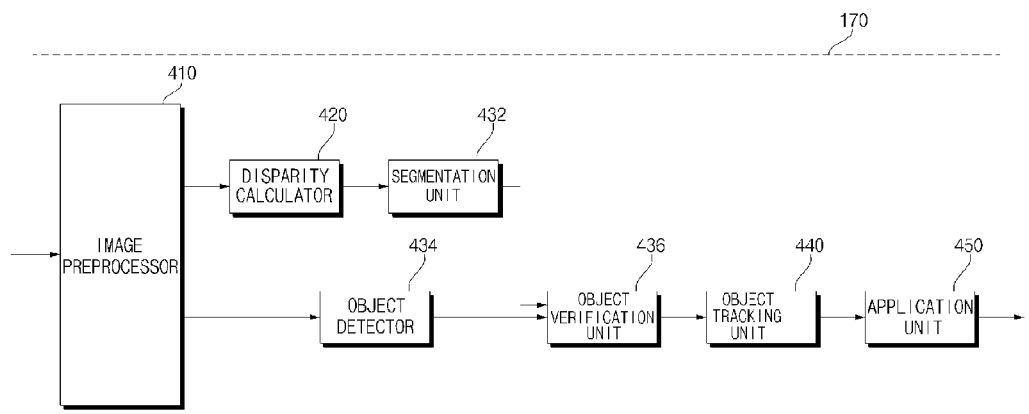
Figure 5:
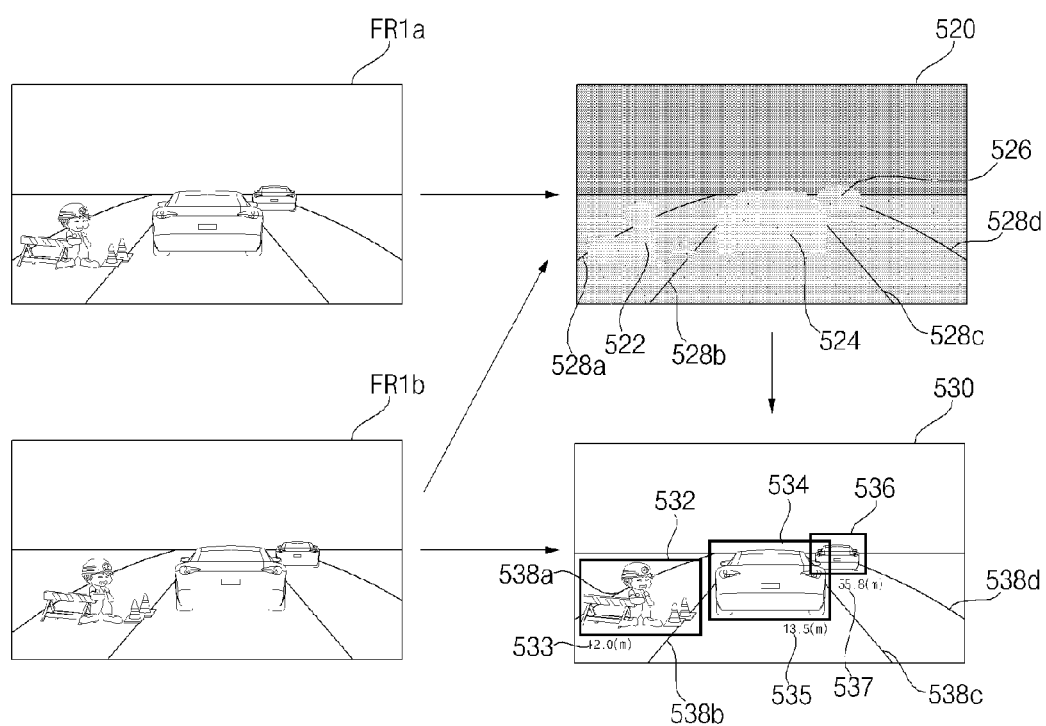
FIG. 5 is a series of views showing object detection performed by the processor of FIGS. 4A and 4B.

FIGS. 4A and 4B are internal block diagrams showing various examples of the processor shown in FIG. 3, and FIG. 5 is a series of views showing object detection performed by the processor of FIGS. 4A and 4B.

Referring first to FIG. 4A, which is an internal block diagram showing an example of the processor 170, the processor 170 of the vehicle charge assistance device 100 may include an image preprocessor 410, a disparity calculator 420, a segmentation unit 432, an object detector 434, an object verification unit 436, an object tracking unit 440, and an application unit 450.

The image preprocessor 410 may receive a plurality of images from the cameras 195*a*, 195*b*, 195*c*, and 195*d* or a generated around view image, and may preprocess the plurality of images or the generated around view image.

Specifically, the image preprocessor 410 may perform noise reduction, rectification, calibration, color enhancement, color space conversion (CSC), interpolation, and camera gain control, or the like, for the plural images or the generated around view image. As a result, the image preprocessor 410 may acquire an image that is more vivid than the images from the cameras 195*a*, 195*b*, 195*c*, and 195*d* or the generated around view image.

The disparity calculator 420 may receive the plurality of images or the generated around view image signal-processed by the image preprocessor 410, sequentially perform stereo matching for the received plural images or the received around view image for a predetermined time, and acquire a disparity map based on the stereo matching. That is, the disparity calculator 420 may acquire disparity information for a view around the vehicle.

The stereo matching may be performed on a per pixel basis or a per predetermined block basis of the images. Meanwhile, the disparity information may mean a map showing binocular parallax information as values.

The segmentation unit 432 may perform segmentation and clustering in the images based on the disparity information from the disparity calculator 420. Specifically, the segmentation unit 432 may segment at least one of the images into a background and a foreground based on the disparity information.

For example, a region having a predetermined value or less of the disparity information in the disparity map may be calculated as a background and the region may be excluded. As a result, a foreground may be relatively separated from the image. In another example, a region having a predetermined value or more of the disparity information in the disparity map may be calculated as a foreground and the region may be extracted. As a result, the foreground may be separated from the image.

As described above, the image may be segmented into the background and the foreground based on the disparity information extracted based on the image. Subsequently, therefore, signal processing speed and signal processing amount may be reduced during detection of an object.

The object detector 434 may detect an object based on the image segment from the segmentation unit 432. That is, the object detector 434 may detect an object for at least one of the images based on the disparity information.

Specifically, the object detector 434 may detect an object for at least one of the images. For example, the object detector 434 may detect an object from a foreground separated from the image by the image segment.

Subsequently, the object verification unit 436 may classify and verify the separated object. To this end, the object verification unit 436 may use a recognition method using a neural network, a support vector machine (SVM) method, a recognition method based on AdaBoost using a Haar-like feature, or a histograms of oriented gradients (HOG) method, or the like. On the other hand, the object verification unit 436 may compare the detected object with objects stored in the memory 140 to verify the detected object. For example, the object verification unit 436 may verify an adjacent vehicle, a lane, a road surface, a traffic sign, a dangerous zone, a tunnel, etc., located around the vehicle.

The object tracking unit 440 may track the verified object. For example, the object tracking unit 440 may verify an object in images which are sequentially acquired, calculate motion or a motion vector of the verified object, and track movement of the object based on the calculated motion or the calculated motion vector. Consequently, the object tracking unit 440 may track an adjacent vehicle, a lane, a road surface, a traffic sign, a dangerous zone, etc., located around the vehicle.

FIG. 4B is an internal block diagram showing another example of the processor 170. The processor 170 of FIG. 4B is identical in construction to the processor 170 of FIG. 4A except that a signal processing sequence of the processor 170 of FIG. 4B is different from that of the processor 170 of FIG. 4A. Hereinafter, merely for convenience a description will be given of only the difference between the processor 170 of FIG. 4B and the processor 170 of FIG. 4A.

The object detector 434 may receive a plurality of images or a generated around view image and detect an object in the plurality of images or the generated around view image. Unlike in FIG. 4A, the object detector 434 may not detect an object for an image segmented based on disparity information, but may directly detect an object from the plurality of images or the generated around view image.

Subsequently, the object verification unit 436 may classify and verify the detected and separated object based on the image segment from the segmentation unit 432 and the object detected by the object detector 434. To this end, the object verification unit 436 may use a recognition method using a neural network, an SVM method, a recognition method based on AdaBoost using a Haar-like feature, or a HOG method, or the like.

FIG. 5 is a series of reference views illustrating an operation of the processor 170 shown in FIG. 4A or 4B based on images acquired from first and second frame periods. The cameras 195a, 195b, 195c, and 195d may sequentially acquire images FR1a and FR1b during the first and second frame periods.

The disparity calculator 420 of the processor 170 may receive the images FR1a and FR1b signal-processed by the image preprocessor 410 and may perform stereo matching for the received images FR1a and FR1b to acquire a disparity map 520. The disparity map 520 may show a disparity between the images FR1a and FR1b as levels. When a disparity level is high, the distance to the vehicle may be calculated as being short. When a disparity level is low, on the other hand, the distance to the vehicle may be calculated as being long.

Meanwhile, in a case in which the disparity map is displayed, the disparity map may be displayed with higher brightness when the disparity level is higher and the disparity map may be displayed with lower brightness when the disparity level is lower.

For example, in the disparity map 520, first to fourth lanes 528a, 528b, 528c, and 528d may have their own disparity levels and a construction zone 522, a first preceding vehicle 524, and a second preceding vehicle 526 may have their own disparity levels.

The segmentation unit 432, the object detector 434, and the object verification unit 436 may respectively perform segmentation, object detection, and object verification for at least one of the images FR1a and FR1b based on the disparity map 520.

FIG. 5 shows, by way of example, that object detection and object verification for the second image FR1b may be performed using the disparity map 520. That is, object detection and object verification for first to fourth lanes 538a, 538b, 538c, and 538d, a construction zone 532, a first preceding vehicle 534, and a second preceding vehicle 536 in an image 530 may be performed. Meanwhile, images may be continuously acquired and the object tracking unit 440 may track verified objects.

Figure 6:
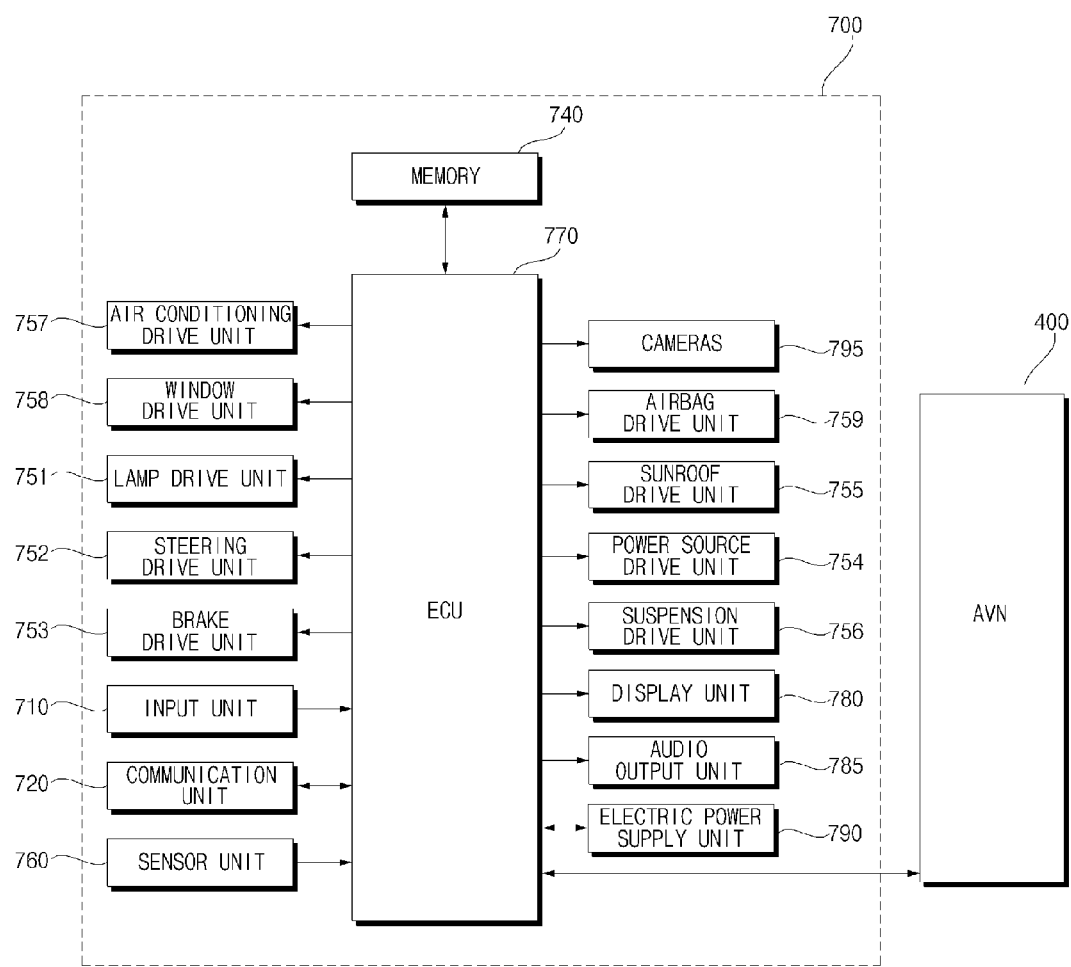
FIG. 6 is an internal block diagram showing an example of a vehicle according to an embodiment of the present disclosure.

FIG. 6 is an internal block diagram showing an example of a vehicle according to an embodiment of the present disclosure. The vehicle 200 may include an electronic control apparatus 700 for vehicle control. The electronic control apparatus 700 may exchange data with the AVN apparatus 400.

The electronic control apparatus 700 may include an input unit 710, a communication unit 720, a memory 740, a lamp drive unit 751, a steering drive unit 752, a brake drive unit 753, a power source drive unit 754, a sunroof drive unit 755, a suspension drive unit 756, an air conditioning drive unit 757, a window drive unit 758, an airbag drive unit 759, a sensor unit 760, an ECU 770, a display unit 780, an audio output unit 785, an electric power supply unit 790, and a plurality of cameras 795. In addition, the electronic control apparatus 700 may further include an antenna 160 and a battery 165. The antenna 160 and the battery 165 have been previously described with reference to FIG. 3A and, therefore, a description thereof will be omitted.

Meanwhile, the ECU 770 may include a processor. Alternatively, an additional processor to signal-process images from the cameras may be provided in addition to the ECU 770.

The input unit 710 may include a plurality of buttons or a touchscreen provided in the vehicle 200. Various input operations may be performed through the buttons or the touchscreen.

The communication unit 720 may exchange data with the mobile terminal 600 or the server 500 in a wireless fashion. In particular, the communication unit 720 may exchange data with a mobile terminal of the driver in a wireless fashion. To this end, various wireless data communication protocols, such as Bluetooth, Wi-Fi, Wi-Fi Direct, and APiX, may be used.

The communication unit 720 may receive weather information and road traffic state information, such as TPEG information, from the mobile terminal 600 or the server 500. When a user gets into the vehicle, a mobile terminal 600 of the user may pair with the electronic control apparatus 700 automatically or by the user executing an application.

The memory 740 may store various data for overall operation of the electronic control apparatus 700, such as programs for processing or control of the ECU 770.

The lamp drive unit 751 may control turn on/turn off of lamps provided inside and outside the vehicle. In addition, the lamp drive unit 751 may control intensity, direction, etc. of light emitted from each lamp. For example, the lamp drive unit 751 may control a direction indicating lamp, a brake lamp, etc.

The steering drive unit 752 may electronically control a steering apparatus (not shown) in the vehicle 200. Consequently, the steering drive unit 752 may change a heading of the vehicle.

The brake drive unit 753 may electronically control a brake apparatus (not shown) in the vehicle 200. For example, the brake drive unit 753 may control an operation of a brake mounted at each wheel to reduce speed of the vehicle 200. In another example, the brake drive unit 753 may differently control operations of brakes mounted at left wheels and right wheels to adjust the heading of the vehicle 200 to the left or the right.

The power source drive unit 754 may electronically control a power source in the vehicle 200. For example, in a case in which the power source is an engine (not shown) using fossil fuel, the power source drive unit 754 may electronically control the engine. Consequently, the power source drive unit 754 may control output torque of the engine. In another example, in a case in which the power source is an electric motor, the power source drive unit 754 may control the motor. Consequently, the power source drive unit 754 may control rotational speed and torque of the motor.

The sunroof drive unit 755 may electronically control a sunroof apparatus in the vehicle 200. For example, the sunroof drive unit 755 may control a sunroof to be opened or closed.

The suspension drive unit 756 may electronically control a suspension apparatus in the vehicle 200. For example, in a case in which a road surface is uneven, the suspension drive unit 756 may control the suspension apparatus to reduce vibration of the vehicle 200.

The air conditioning drive unit 757 may electronically control an air conditioner in the vehicle 200. For example, in a case in which the internal temperature of the vehicle is high, the air conditioning drive unit 757 may control the air conditioner to supply cool air into the vehicle.

The window drive unit 758 may electronically control a window apparatus in the vehicle 200. For example, the window drive unit 758 may control left and right side windows of the vehicle to be opened or closed.

The airbag drive unit 759 may electronically control an airbag apparatus in the vehicle 200. For example, the airbag drive unit 759 may control an airbag to deploy in a dangerous situation.

The sensor unit 760 may sense a signal related to travel of the vehicle 200. To this end, the sensor unit 760 may include a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, and an in-vehicle humidity sensor, or another appropriate type of sensor.

Consequently, the sensor unit 760 may acquire a sensing signal for vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, and in-vehicle humidity information, and the like.

In addition, the sensor unit 760 may further include an engine speed sensor, an air flow sensor (AFS), an intake air temperature sensor (ATS), a water temperature sensor (WTS), a throttle position sensor (TPS), a top dead center (TDC) sensor, and a crank angle sensor (CAS).

The ECU 770 may control overall operation of each unit in the electronic control apparatus 700. The ECU 770 may perform a specific operation based on an input through the input unit 710, receive and transmit a signal sensed by the sensor unit 760 to the vehicle charge assistance device 100, receive map information from the AVN apparatus 400, or control operations of the respective drive units 751, 752, 753, 754, and 756. In addition, the ECU 770 may receive weather information and road traffic state information, such as TPEG information, from the communication unit 720.

Meanwhile, the ECU 770 may generate a vehicle movement direction signal to move the vehicle to the charge system 800 based on a plurality of images photographed by the plural cameras 795 and generate a guide signal to adjust the position of the vehicle based on the magnetic field 810 from the charge system 800 received by the antenna 160.

Moreover, the ECU 770 may combine a plurality of images received from the plural cameras 795 to generate an around view image. In particular, when the vehicle moves forward at a predetermined speed or less or when the vehicle moves backward, the ECU 770 may generate an around view image.

The display unit 780 may display the generated around view image. In particular, the display unit 180 may provide various user interfaces in addition to the around view image. In order to display the around view image, etc., the display unit 780 may include a cluster or an HUD provided at the inside front of the vehicle. In a case in which the display unit 180 is the HUD, the display unit 180 may include a projection module to project an image on the front windshield glass of the vehicle 200. Meanwhile, the display unit 780 may include a touchscreen to allow input by tapping on the screen.

The audio output unit 785 may convert an electric signal received from the ECU 770 into an audio signal and outputs the audio signal. To this end, the audio output unit 785 may include a speaker. The audio output unit 785 may output a sound corresponding to an operation of the input unit 710, e.g. a button.

The electric power supply unit 790 may supply electric power to the respective components under control of the ECU 770. In particular, electric power from an in-vehicle battery (not shown) may be supplied to the electric power supply unit 790.

The multiple cameras 795 may be used to provide an around view image. To this end, the cameras 795 may include four cameras as shown in FIG. 2A. For example, a plurality of around view cameras 195*a*, 195*b*, 195*c*, and 195*d* may be disposed at the left side, the rear, the right side, and the front of the vehicle, respectively. A plurality of images photographed by the cameras 795 may be transmitted to the ECU 770 or an additional processor.

Figure 7:
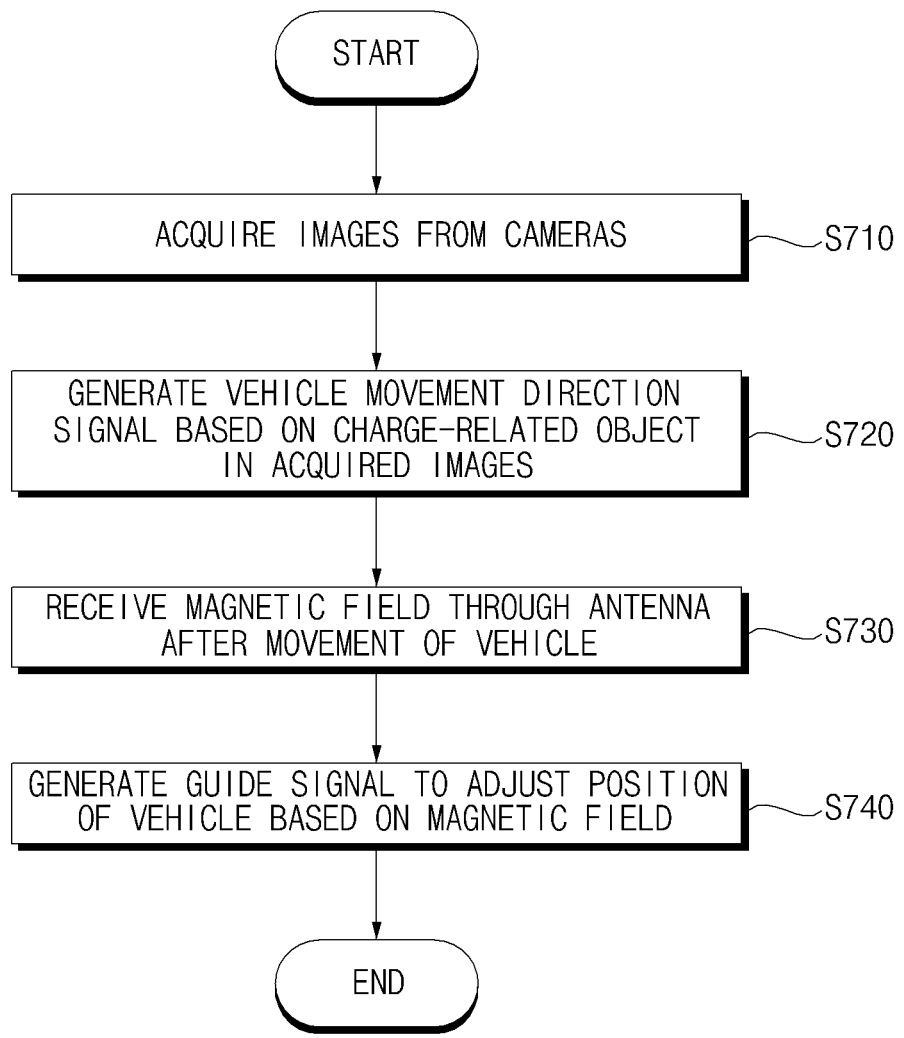
FIG. 7 is a flowchart of a method of operating the vehicle charge assistance device according to the embodiment of the present disclosure.

FIG. 7 is a flowchart of a method of operating the vehicle charge assistance device according to an embodiment of the present disclosure and FIGS. 8A to 11D are reference views illustrating the method of operating the vehicle charge assistance device of FIG. 7.

Referring first to FIG. 7, the vehicle charge assistance device 100 may acquire a plurality of images from multiple cameras mounted on the vehicle, in step S710. The processor 170 may receive a plurality of images from the plural cameras 195*a*, 195*b*, 195*c*, and 195*d*. For example, when the vehicle moves forward at a predetermined speed or less or when the vehicle moves backward, the plurality of cameras 195a, 195b, 195c, and 195d may be activated to photograph images and the processor 170 may receive the images photographed by the respective cameras.

Subsequently, the vehicle charge assistance device 100 may generate a vehicle movement direction signal based on a charge-related object (e.g., charging mat, signs, symbols, painted lines, etc.) in the acquired images, in step S720.

The processor 170 may acquire a plurality of images from the cameras 195a, 195b, 195c, and 195d and signal-process the acquired images based on computer vision. In addition, the processor 170 may detect an object in the images and continuously track motion of the object after detection of the object.

The processor 170 may recognize a charge-related object in an image from at least one of the cameras 195a, 195b, 195c, and 195d corresponding to the charge system 800 or a guide member for guiding the vehicle 200 toward the charge system 800. For example, the processor 170 may detect, verify, and track a charge-related object in the image. In addition, the processor 170 may generate a vehicle movement direction signal corresponding to the detected and verified charge-related object.

In a case in which the distance to the charge system 800 is greater than or equal to a first distance, the processor 170 may generate a vehicle movement direction signal based on a charge-related object in the images from the cameras. The vehicle movement direction signal is a signal to move the vehicle to the charge system 800. The vehicle movement direction signal may include a movement distance in addition to a movement direction.

Upon deciding the vehicle movement direction, the processor 170 may generate a vehicle movement direction signal such that the front view camera is directed to the middle point of the charge system 800. For example, the processor 170 may generate a vehicle movement direction signal in consideration of at least one of the middle point of the charge system 800, the width of the vehicle, or the length of the vehicle.

Subsequently, the vehicle charge assistance device 100 may receive a magnetic field 810 from the charge system 800 through the antenna 160 after movement of the vehicle, in step S730. Subsequently, the vehicle charge assistance device 100 may generate a guide signal to adjust the position of the vehicle based on the magnetic field 810, in step S740.

On the other hand, in a case in which the antenna 160 receives a magnetic field 810 having predetermined intensity or more after movement of the vehicle, the processor 170 may generate a guide signal to adjust the position of the vehicle using information regarding intensity and direction of the received magnetic field 810.

The guide signal to adjust the position of the vehicle may be a guide signal for fine adjustments to achieve accurate positioning between the battery 165 mounted in the vehicle and the charge system 800. The guide signal to adjust the position of the vehicle may include a movement direction and a movement distance for minute movement of the vehicle.

In a case in which the distance to the charge system 800 is within a second distance that is less than the first distance after movement of the vehicle, the processor 170 may generate a vehicle movement direction signal or a guide signal to adjust the position of the vehicle based on the magnetic field 810.

For example, in a case in which the distance to the charge system 800 is within a third distance that is less than the second distance, the processor 170 may generate a guide signal to adjust the position of the vehicle based on the magnetic field 810.

Upon generating a guide signal to adjust the position of the vehicle, on the other hand, the processor 170 may generate the guide signal to adjust the position of the vehicle such that the middle point of the battery located in the vehicle corresponds to the middle point of the charge system 800.

Meanwhile, the processor 170 may decide an optimal vehicle movement direction in which the vehicle optimally moves to the charge-related object based on the magnetic field 810. The guide signal to adjust the position of the vehicle may include an optimal vehicle movement direction signal.

Meanwhile, the processor 170 may decide an optimal vehicle movement direction in which the vehicle optimally moves to the charge-related object based on the magnetic field 810. In a case in which the vehicle movement direction according to the vehicle movement direction signal is identical to the optimal vehicle movement direction, the guide signal to adjust the position of the vehicle may include vehicle movement distance information.

On the other hand, in a case in which the intensity of the magnetic field 810 is equal to or greater than a predetermined level, the processor 170 may generate a vehicle movement direction signal based on the magnetic field 810 and may generate a guide signal to adjust the position of the vehicle based on the magnetic field 810 after movement of the vehicle according to the vehicle movement direction signal.

FIGS. 8A to 8D are views illustrating movement of the vehicle toward the charge system. When the vehicle moves forward at a predetermined speed or less or when the vehicle moves backward, the around view cameras 195a, 195b, 195c, and 195d are activated.

Figure 8A:
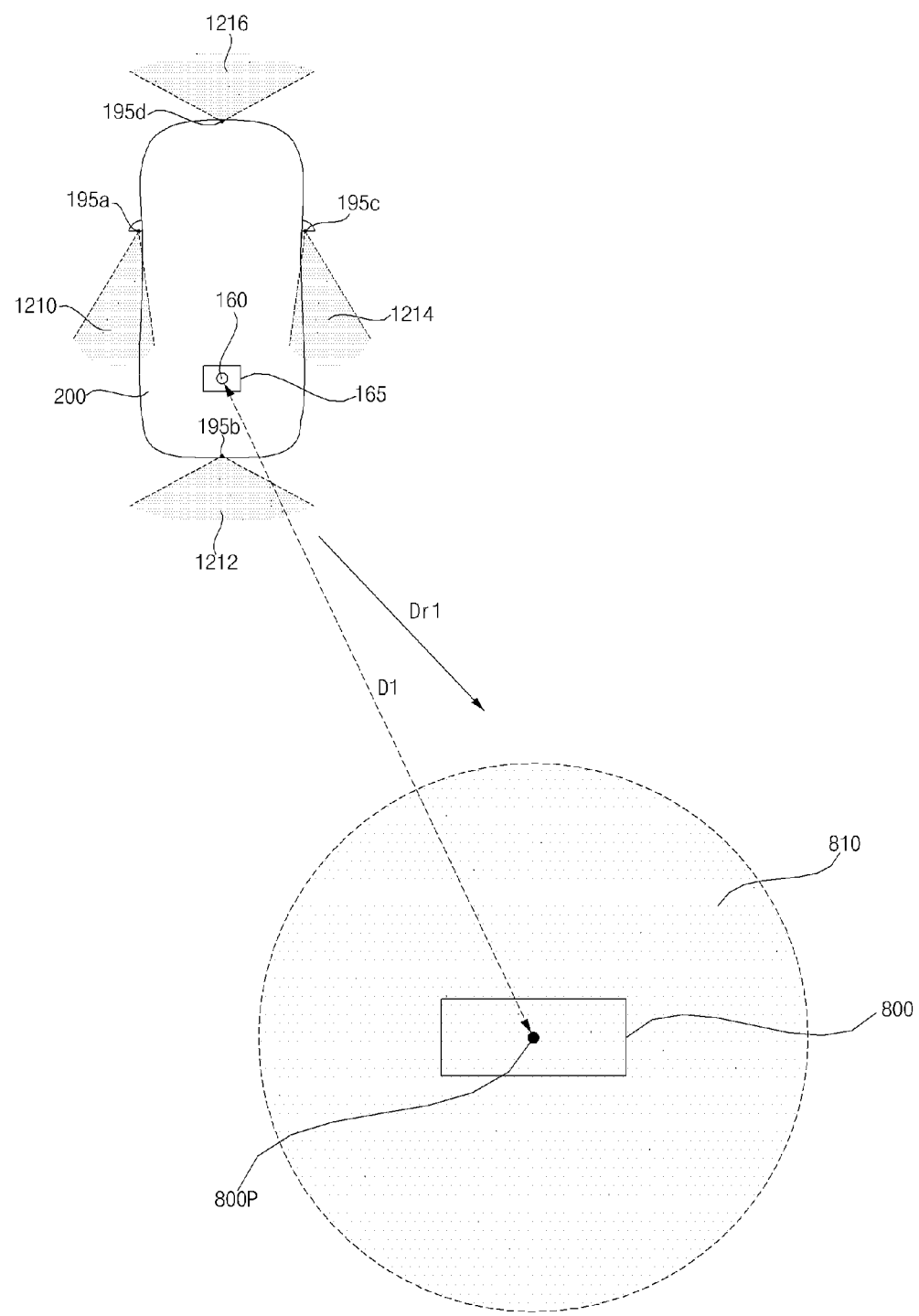
FIGS. 8A to 11D are views illustrating the method of operating the vehicle charge assistance device of FIG. 7.

FIG. 8A shows, by way of example, that the left side view camera 195a photographs a left ground region 1210, the rear view camera 195b photographs a rear region 1212, the right side view camera 195c photographs a right ground region 1214, and the front view camera 195d photographs a front region 1216.

The battery 165 may be disposed at a rear portion of the vehicle 200 and the antenna 160 may be disposed at a position corresponding to a middle point of the battery 165. However, it should be appreciated that the battery 165 and the antenna 160 may be disposed at various other positions.

The processor 170 may recognize a charge-related object in an image photographed by at least one, e.g. the rear view camera 195b, of the cameras 195a, 195b, 195c, and 195d corresponding to the charge system 800 or a guide member to guide the charge system 800.

In a case in which the charge system 800 is located at the right rear of the vehicle as illustrated in FIG. 8A, the processor 170 may detect, verify, and recognize an object corresponding to the charge system 800. Here, cameras corresponding to the relative position of the charge system 800 may be used, for example, the rear view camera 195b and/or the right side view camera 195c. The processor 170 may generate a vehicle movement direction signal based on the recognized object corresponding to the charge system 800.

For example, upon deciding the vehicle movement direction, the processor 170 may generate a vehicle movement direction signal such that the rear view camera 195b mounted at the rear end of the vehicle is directed to the middle point of the charge system 800. In addition, the processor 170 may generate a vehicle movement direction signal in consideration of at least one of the middle point 800P of the charge system 800, the width Wa of the vehicle, or the length La of the vehicle.

For example, in the example illustrated in FIG. 8A, a vehicle movement direction signal indicating a right rear direction Dr1 may be generated. Meanwhile, the processor 170 may generate a distance by which the vehicle is to move in addition to generation of the vehicle movement direction signal. As illustrated in FIG. 8A, the distance between the middle point 800P of the charge system 800 and the middle point of the battery 165 may be D1.

That is, the processor 170 may generate a vehicle movement direction signal Dr1 indicating the right rear direction and a movement distance D1 based on the image.

In addition, the processor 170 may control information related to the generated vehicle movement direction signal Dr1 and the generated movement distance D1 to be output through the display unit 180 or the audio output unit 185. The processor 170 may combine images from the front view camera, the rear view camera, the left side view camera, and the right side view camera to generate an around view image and control a vehicle movement path to be displayed on the display unit 180 while controlling the around view image to be displayed on the display unit 180.

In addition, the display unit 180 may further display at least one selected from among an in-vehicle battery object, information regarding the distance between the battery object and the charge system 800, and information regarding the direction from the battery object to the charge system 800 in addition to the vehicle movement path.

Meanwhile, the processor 170 may control at least one of the steering drive unit 752, the brake drive unit 753, or the power source drive unit 754 to be operated based on the generated vehicle movement direction signal Dr1 and the generated movement distance D1.

The processor 170 may control the vehicle to enter an automatic vehicle driving mode based on the vehicle movement direction signal Dr1 and the movement distance D1 generated based on the images, and control the power source drive unit 754 and the steering drive unit 752 according to the automatic vehicle driving mode such that the vehicle 200 moves in the corresponding direction.

Figure 8B:
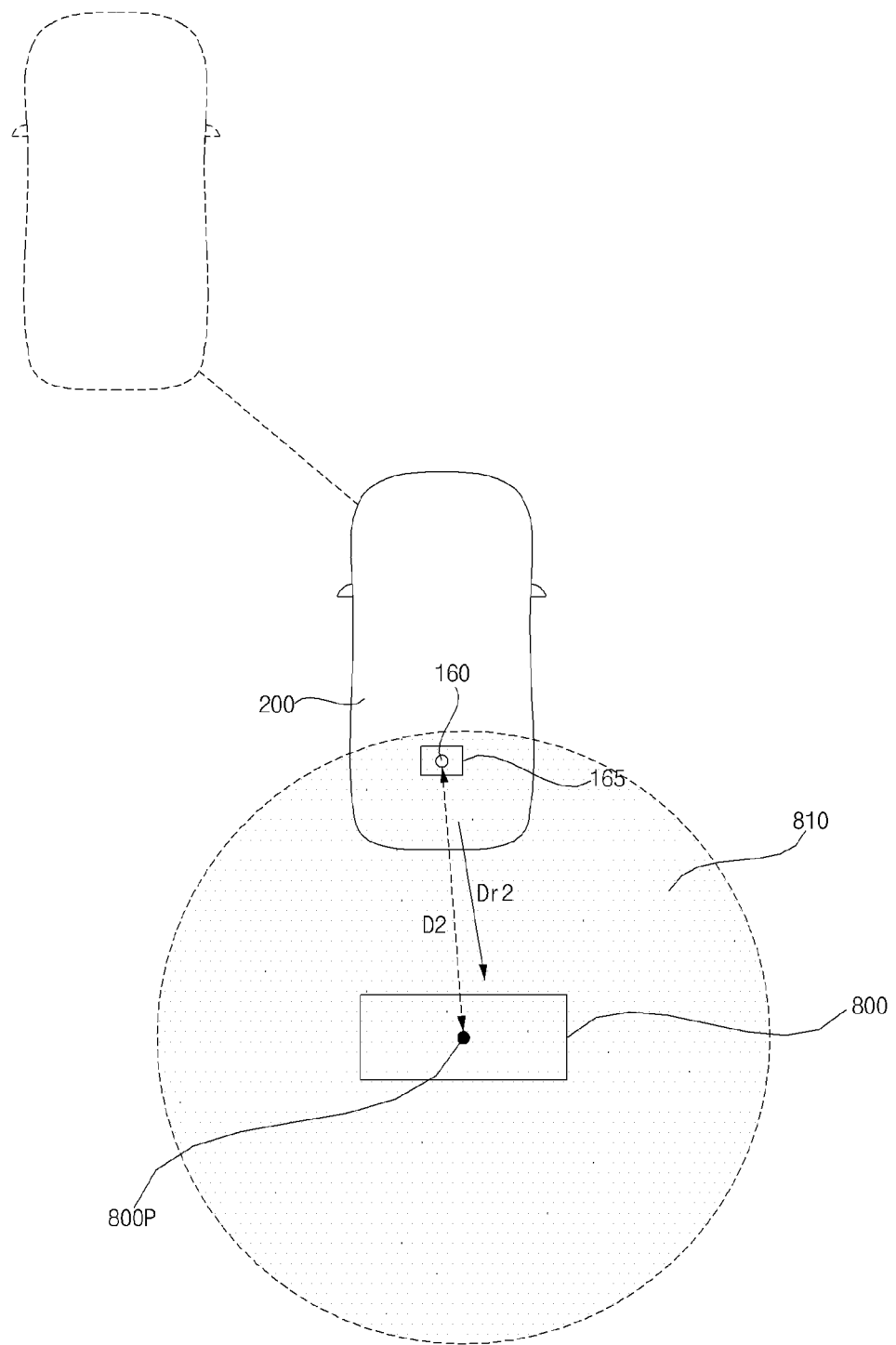

FIG. 8B illustrates, by way of example, that the antenna is activated to generate a vehicle movement direction signal based on the magnetic field after movement of the vehicle 200 in response to the vehicle movement direction signal of FIG. 8A.

The antenna 160 may be activated when the intensity of the magnetic field 810 of the charge system 800 is greater than or equal to a predetermined value. That is, when the vehicle 200 has moved within a predetermined distance of the charge system 800 such that the signal level is at a desired level, the antenna 160 may be activated.

That is, in a case in which the distance to the charge system 800 is greater than or equal to a first distance r1, as illustrated by the dotted circle in FIG. 8A, the processor 170 may generate a vehicle movement direction signal based on the charge-related object in the images from the cameras. On the other hand, when the distance of the vehicle to the charge system 800 is a second distance less than the first distance r1, as illustrated in FIG. 8B, the processor 170 may generate a vehicle movement direction signal using information regarding intensity and direction of the magnetic field 810.

FIG. 8B shows, by way of example, that a movement direction signal indicating a right rear direction Dr2 is generated. Here, the distance between the middle point 800P of the charge system 800 and the middle point of the battery 165 is indicated by D2. That is, the processor 170 may generate a vehicle movement direction signal Dr2 indicating the right rear direction and a vehicle movement distance D2 based on the magnetic field.

In addition, the processor 170 may control information related to the generated vehicle movement direction signal Dr2 and the generated vehicle movement distance D2 to be output through the display unit 180 or the audio output unit 185.

Meanwhile, the processor 170 may control at least one of the steering drive unit 752, the brake drive unit 753, or the power source drive unit 754 to be operated based on the generated vehicle movement direction signal Dr2 and the generated vehicle movement distance D2.

Figure 8C:
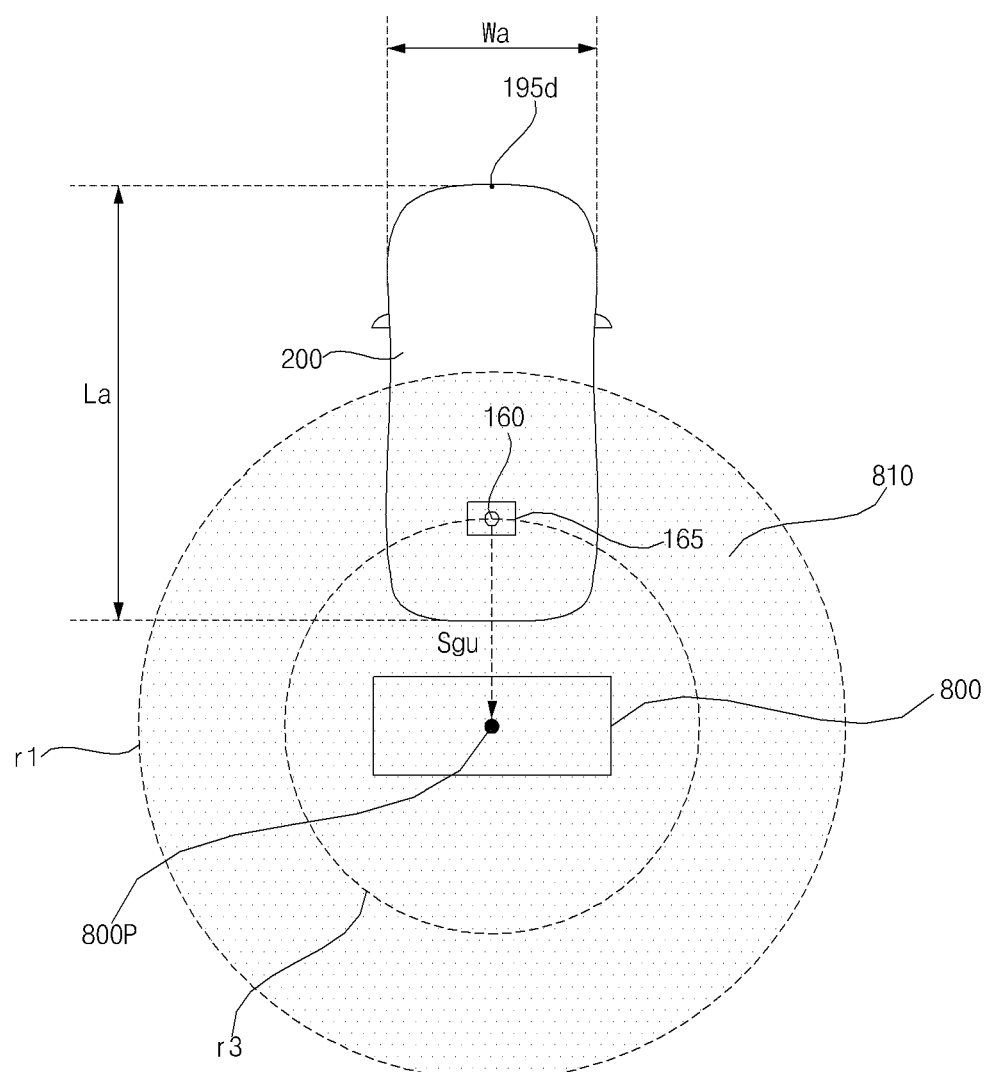

FIG. 8C illustrates, by way of example, that a guide signal to adjust the position of the vehicle is generated based on the magnetic field after movement of the vehicle 200 in response to the vehicle movement direction signal of FIG. 8B. The antenna 160 may receive the magnetic field 810, intensity of which is increased as the vehicle approaches the charge system 800. The antenna 160 may generate a guide signal Sgu to minutely adjust the position of the vehicle 200 based on the magnetic field 810.

That is, when the distance of the vehicle 200 to the charge system 800 is a second distance that is less than the first distance r1, as illustrated in FIG. 8B, the processor 170 may generate a vehicle movement direction signal using information regarding intensity and direction of the magnetic field 810. On the other hand, when the distance of the vehicle 200 to the charge system 800 is within a third distance r3 that is less than the second distance, as illustrated in FIG. 8C, the processor 170 may generate a guide signal Sgu to adjust the position of the vehicle based on the magnetic field 810.

The processor 170 may generate the guide signal Sgu to adjust the position of the vehicle such that the middle point of the battery 160 located in the vehicle corresponds to the middle point of the charge system 800. Alternatively, the processor 170 may generate the guide signal Sgu to adjust the position of the vehicle in consideration of at least one of the middle point 800P of the charge system 800, the width Wa of the vehicle, or the length La of the vehicle.

The processor 170 may decide an optimal vehicle movement direction in which the vehicle 200 can optimally move toward the charge-related object based on the magnetic field 810. The guide signal Sgu to adjust the position of the vehicle may include an optimal vehicle movement direction signal.

The guide signal Sgu may be a backward movement signal to adjust the position of the vehicle rearward. The guide signal Sgu to adjust the position of the vehicle, such as the backward movement signal, may be output through the display unit 180 or the audio output unit 185.

Meanwhile, the processor 170 may control at least one of the steering drive unit 752, the brake drive unit 753, or the power source drive unit 754 to be operated based on the guide signal Sgu to adjust the position of the vehicle.

The movement direction based on the guide signal Sgu as illustrated in FIG. 8C is different from the movement direction Dr2 based on the vehicle movement direction signal of FIG. 8B. In a case in which the movement direction based on the guide signal of FIG. 8C is identical to the movement direction based on the vehicle movement direction signal of FIG. 8B, on the other hand, the processor 170 may generate vehicle movement distance information without vehicle movement direction information when generating the guide signal. For example, once the vehicle 200 has been aligned to the charging device according to the vehicle movement direction signal (e.g., using the cameras), the guide signal may only need to control fine adjustments to move the vehicle in the direction previously set using the vehicle movement direction signal. Here, the processor 170 may previously determine an optimal direction in which to aligning the battery 165 to the charging device 800, and when the direction of the vehicle 200 as set by the vehicle movement direction signal matches the optimal direction, direction information may not be needed in the guide signal.

Moreover, in the situation illustrated in FIG. 8B where the vehicle 200 is positioned within distance r1, the vehicle movement direction signal may be generated using either or both the images obtained from the cameras and the magnetic field 810. Moreover, the distance r3, as illustrated in FIG. 8C, may correspond to a situation where the object of the charge system 800 is no longer visible to the cameras, and hence, only the magnetic field 810 can be used. Alternatively, distance r3 may correspond to a distance where the signal strength of the magnetic field 810 is sufficient to assure a desired accuracy in determining relative position of the vehicle using the magnetic field 810.

Moreover, the first distance r1 and third distance r3 as described herein may be set based on various factors, including but not limited to the position of the battery 165 and antenna 160 on the vehicle 200, accuracy of location determination using the camera and/or magnetic field 810 at certain distances, desired strength of the detected magnetic field 810, or the like.

Figure 8D:
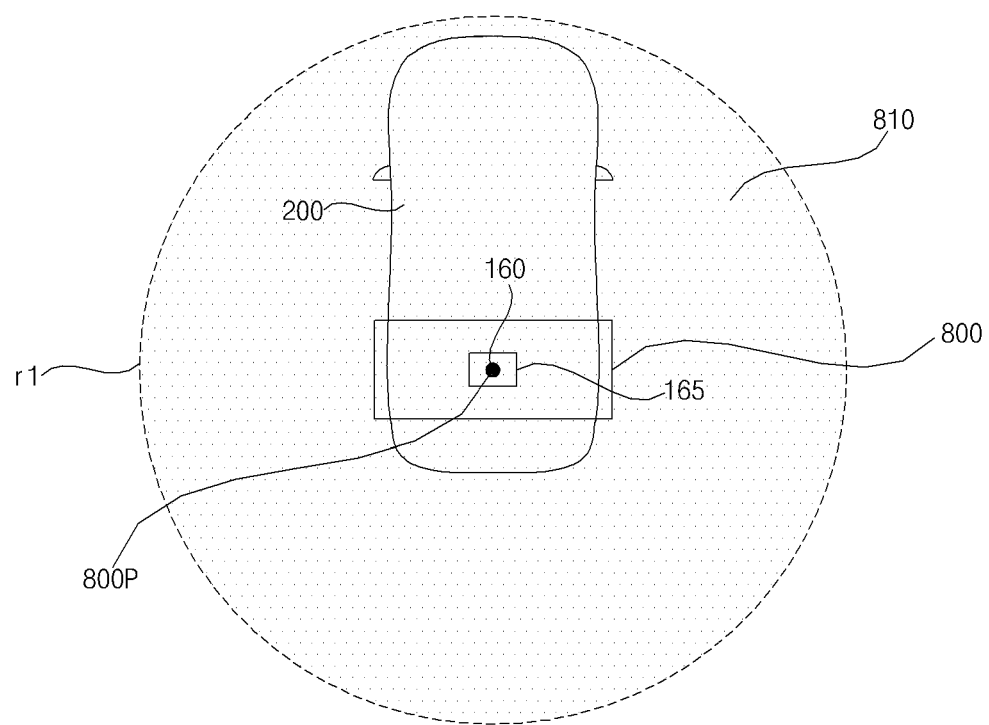

FIG. 8D illustrates, by way of example, a situation where movement of the vehicle toward the charge system 800 in response to a guide signal has been completed. Here, the middle point 800P of the charge system 800 and the middle point of the battery 165 (corresponding to the position of the antenna 160) coincide with each other.

Upon completion of the movement of the vehicle to the charge system 800, the processor 170 may control to output a notification message through the display unit 180 or the audio output unit 185. Here, a user may then input a wireless charging start command.

Alternatively, upon completion of the movement of the vehicle to the charge system 800, the processor 170 may control the battery 165 to be activated such that the battery 165 can automatically be charged with wireless electric power output from the wireless charge system 800.

For example, upon completion of the movement of the vehicle to the charge system 800, the processor 170 may transmit a charging start signal to the charge system 800 through the communication unit 120. Once the battery 165 is charged, the processor 170 may transmit a charging end signal to the charge system 800 through the communication unit 120.

Meanwhile, the communication unit 120 may receive various kinds of information from the charge system 800. For example, the processor 170 may control at least one of billing information, charge amount information, or chargeable time information of the charge system 800 received from the communication unit 120 to be displayed on the display unit 180. As a result, user convenience may be improved.

Figure 9A:
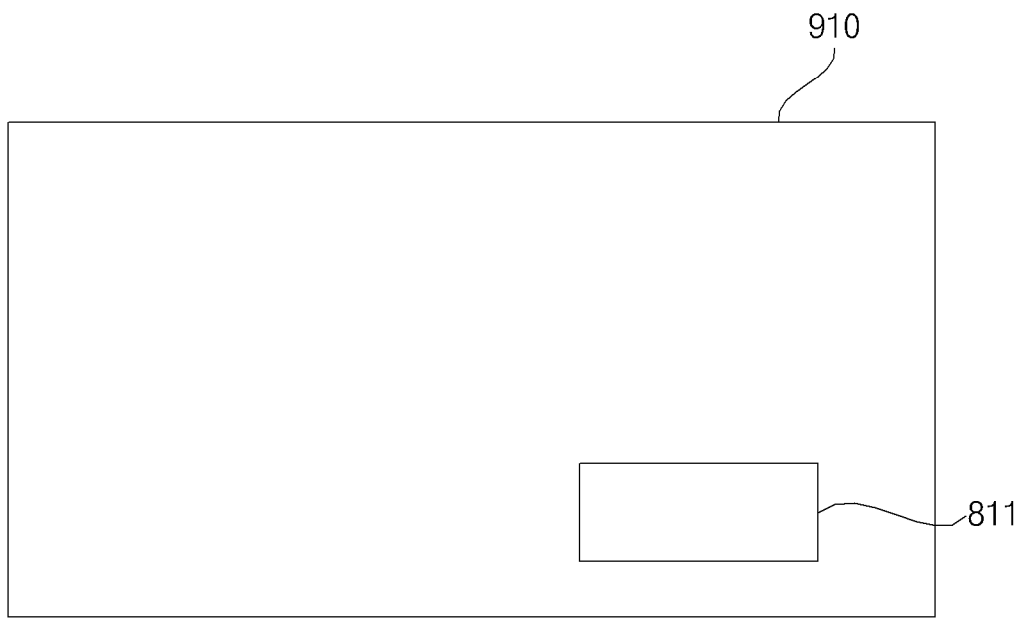

FIGS. 9A to 10B are views showing various examples of vehicle movement based on images. FIG. 9A corresponds to FIG. 8A and shows, by way of example, an image 910 photographed by the rear view camera 195b. As shown in FIG. 9A, the image 910 contains an object 811 for the charge system 800, which is positioned at the right lower part of the image 910. The image 910 may be generated in the perspective of the camera or in the perspective of the driver when moving backward (e.g., lower right as shown).

Figure 9B:
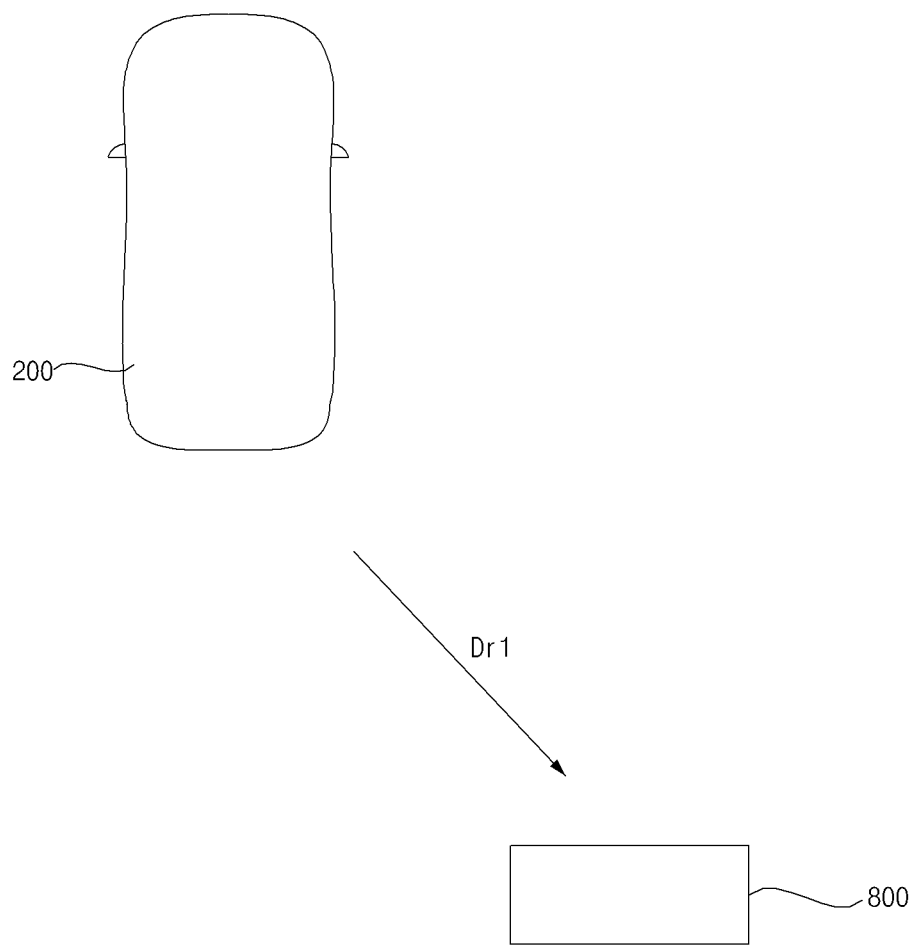

As shown in FIG. 9B, the processor 170 may generate a vehicle movement direction signal Dr1 based on the position of the object 811 for the charge system in the image 910.

Meanwhile, an image corresponding to FIG. 9B may be displayed on the display unit 180. Particularly, in a case in which after generation of an around view image, the around view image is displayed on the display unit 180, vehicle movement direction information and vehicle movement distance information may be displayed in the vicinity of the around view image. As a result, user convenience may be improved.

Figure 10A:
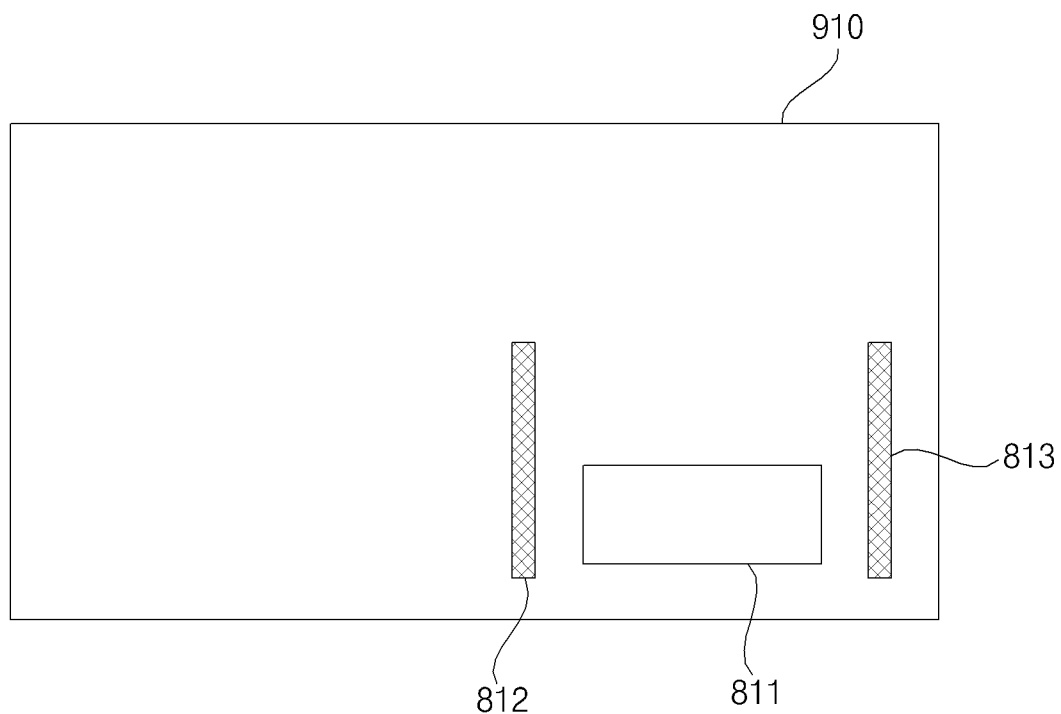

FIG. 10A shows, by way of example, that the image 910 photographed by the rear view camera 195b contains an object 811 for the charge system and objects 812 and 813 for guide members to guide the charge system 800. Each of the guide members may be any one selected from among a post, a parking line, and another parked vehicle.

Figure 10B:
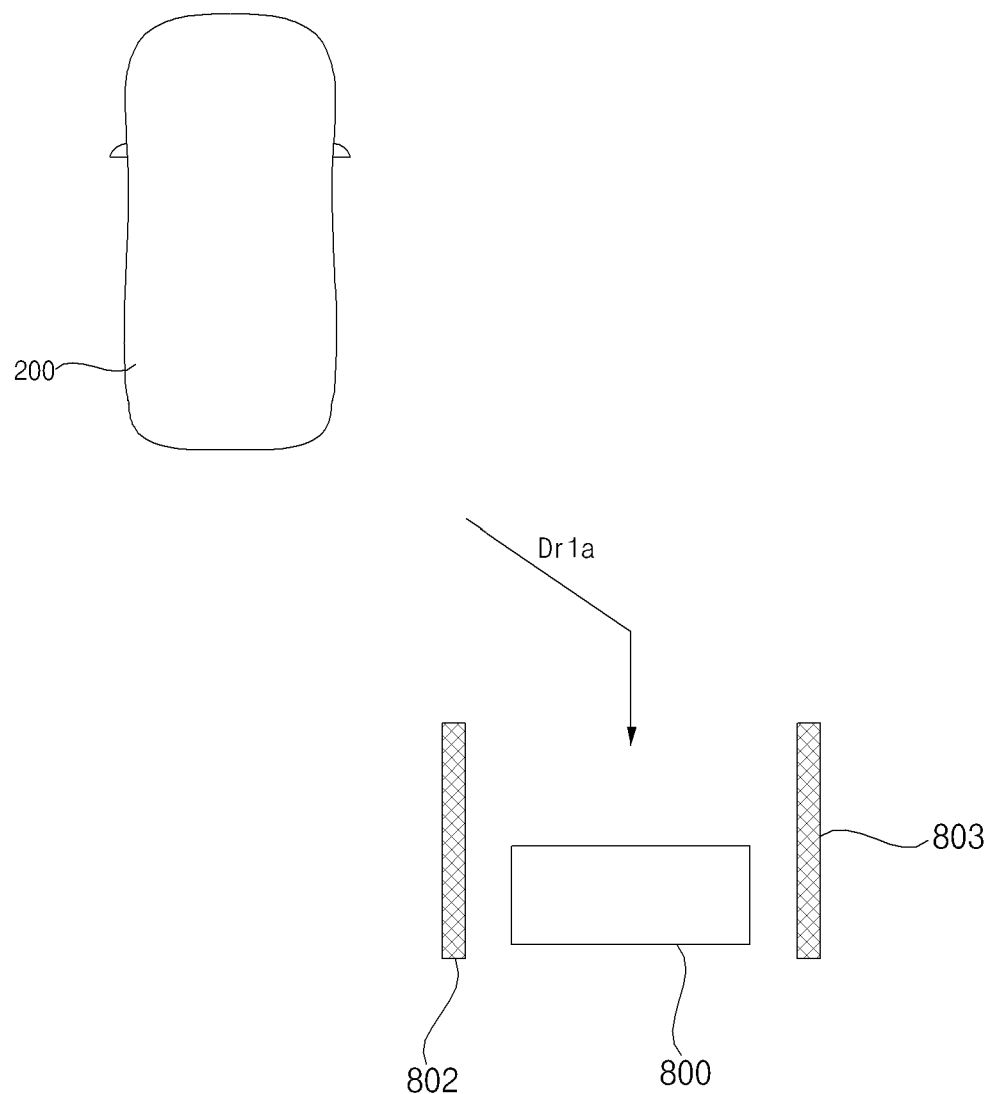

As illustrated in FIG. 10B, the processor 170 may generate a vehicle movement direction signal Dr1a based on the objects 812 and 813 for the guide members as well as the position of the object 811 for the charge system in the image 910. That is, the processor 170 may change the vehicle movement direction in consideration of the guide members in contrast to the embodiment of FIG. 9B. On the other hand, the processor 170 may generate a plurality of vehicle movement directions such that a user can decide one of the vehicle movement directions.

Meanwhile, in a case in which the charge-related object in the image from the camera is not recognized, the processor 170 may generate a vehicle movement direction signal based on the magnetic field 810 and may generate a guide signal to adjust the position of the vehicle based on the magnetic field 810 after movement of the vehicle according to the vehicle movement direction signal.

That is, in a case in which generation of the vehicle movement direction based on the image of FIG. 8A is not possible, the processor 170 may generate a vehicle movement direction signal based on the magnetic field 810 in a similar manner to in FIG. 8B, and may generate a guide signal to adjust the position of the vehicle based on the magnetic field 810 as shown in FIG. 8C after movement of the vehicle according to the vehicle movement direction signal.

On the other hand, in a case in which the charge-related object in the image from the camera is not recognized, the processor 170 may generate a vehicle movement direction signal based on an adjacent object sensing signal from ultrasonic sensors and may generate a guide signal to adjust the position of the vehicle based on the magnetic field 810 after movement of the vehicle according to the vehicle movement direction signal, which will hereinafter be described with reference to FIGS. 11A to 11D. FIGS. 11A to 11D illustrate movement of the vehicle toward the charge system using ultrasonic sensors and the antenna. It is possible to generate a vehicle movement direction signal using the ultrasonic sensors in addition to generation of the vehicle movement direction signal based on the image.

Figure 11A:
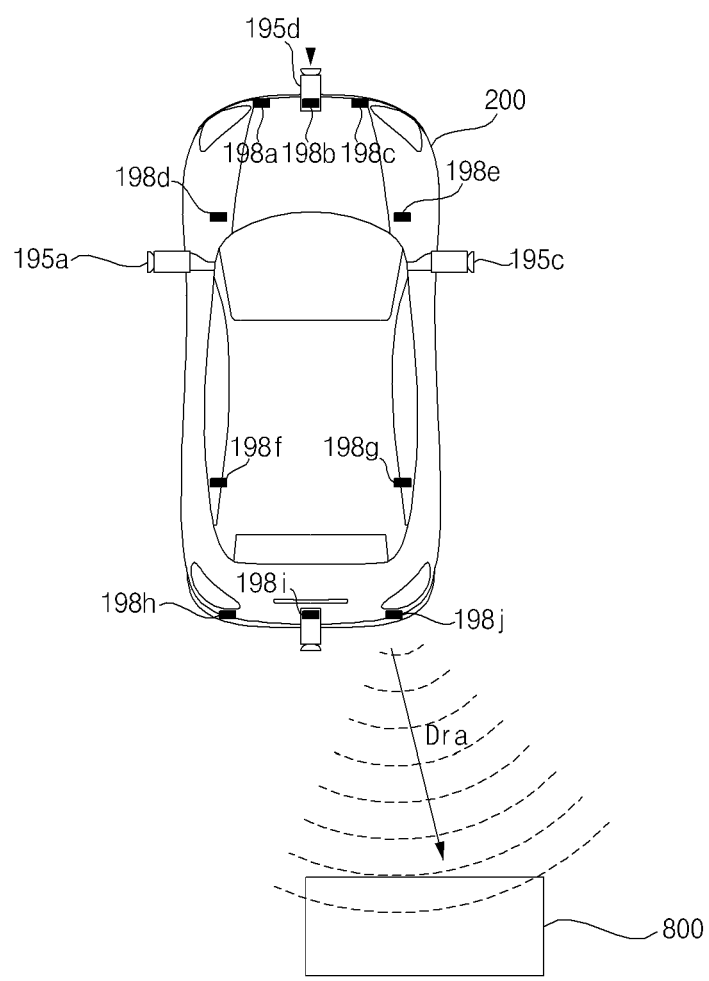

FIG. 11A illustrates, by way of example, that the vehicle 200 further includes a plurality of ultrasonic sensors 198a to 198j to sense an object around the vehicle in addition to the cameras 195a, 195b, 195c, and 195d. The first to third ultrasonic sensors 198a, 198b, and 198c may be attached to the front end of the vehicle, the fourth and fifth ultrasonic sensors 198d and 198e may be attached to opposite sides of the front part of the vehicle, the sixth and seventh ultrasonic sensors 198f and 198g may be attached to opposite sides of the rear part of the vehicle, and the eighth to tenth ultrasonic sensors 198h, 198i, and 198j may be attached to the rear end of the vehicle.

Upon determining that an object is located within a predetermined distance from the vehicle through the ultrasonic sensors 198a to 198j, the processor 170 may generate a vehicle movement direction signal indicating the corresponding direction.

For example, when the charge system 800 is located at the right rear of the vehicle is sensed by the tenth ultrasonic sensor 198j may be used. Consequently, the processor 170 may generate a vehicle movement direction signal indicating a right rear direction Dra.

Figure 11B:
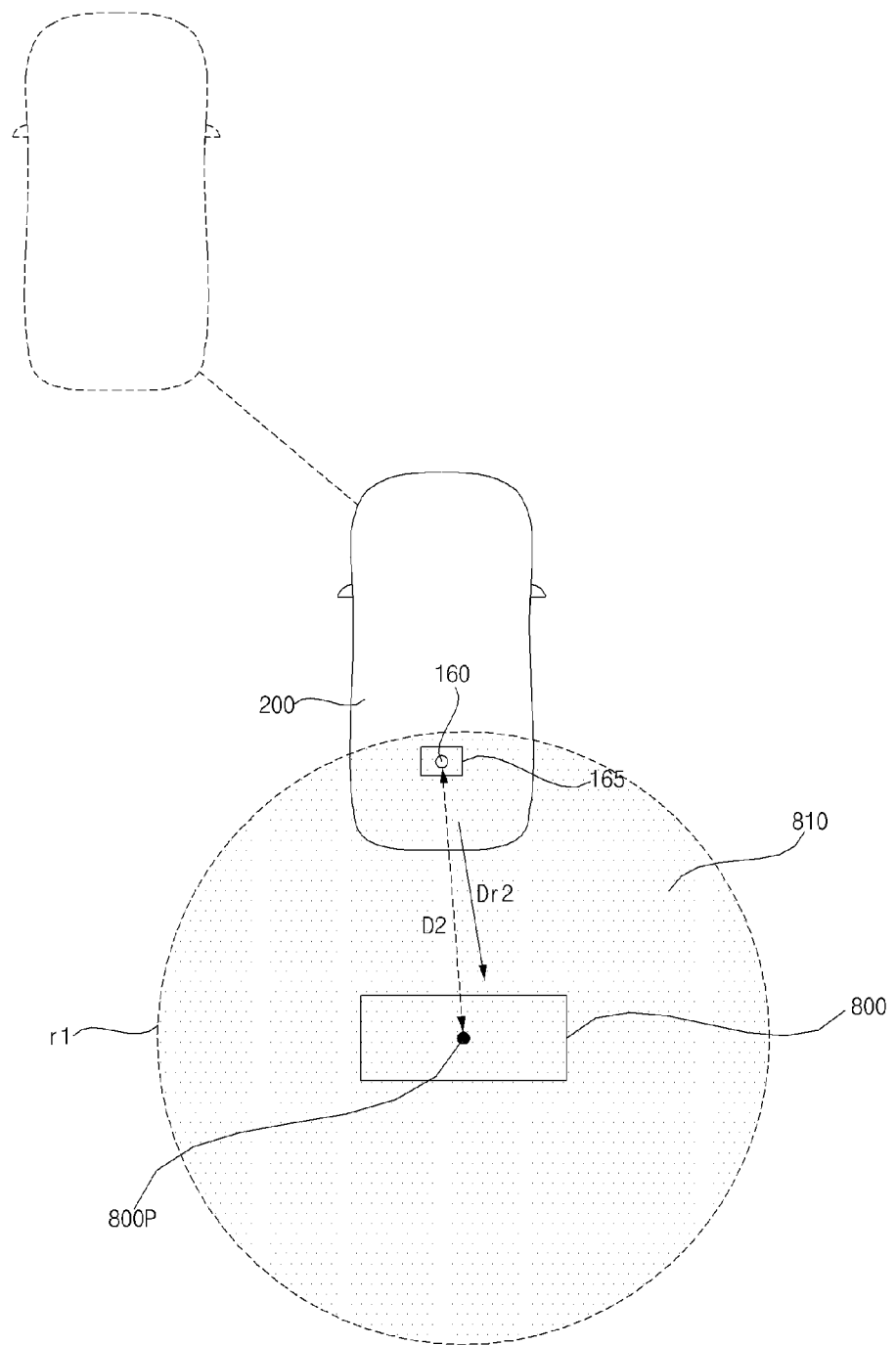
Figure 11C:
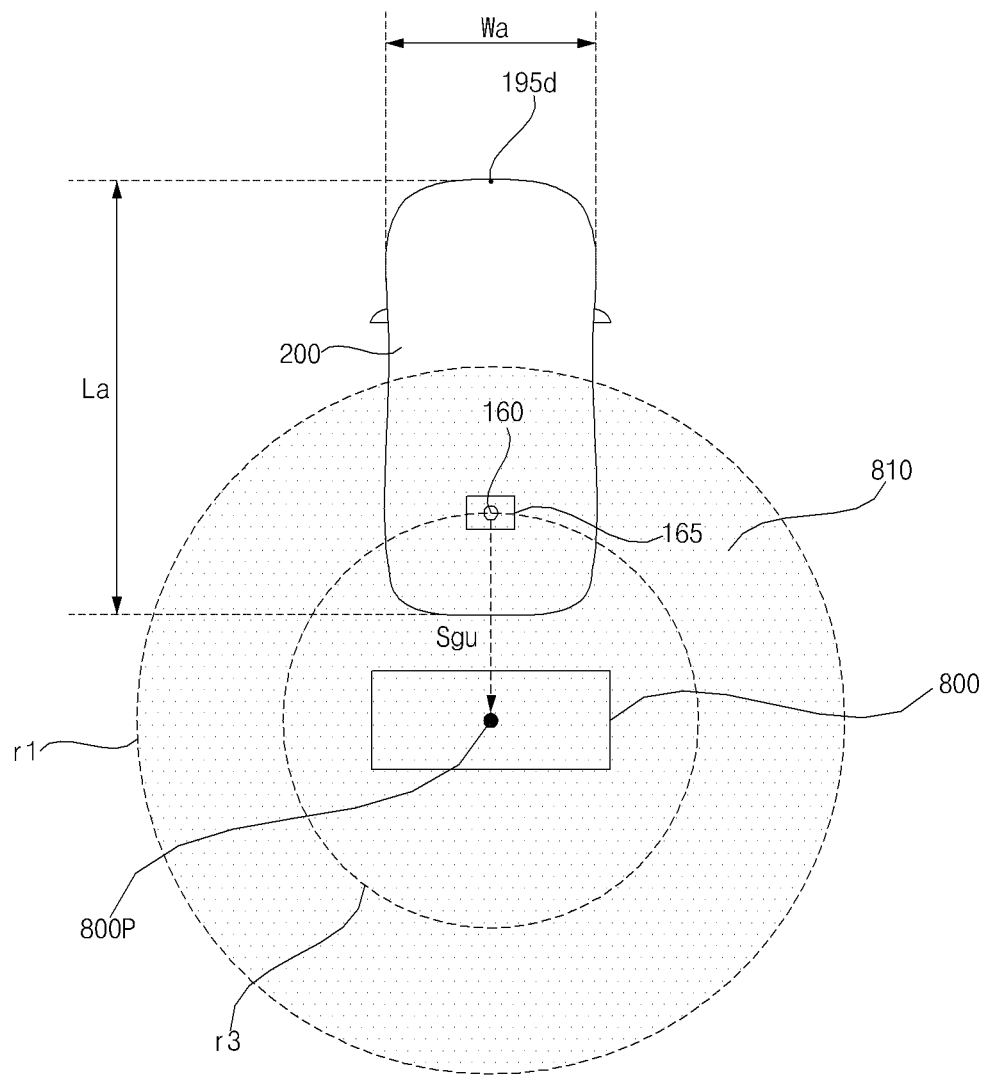
Figure 11D:
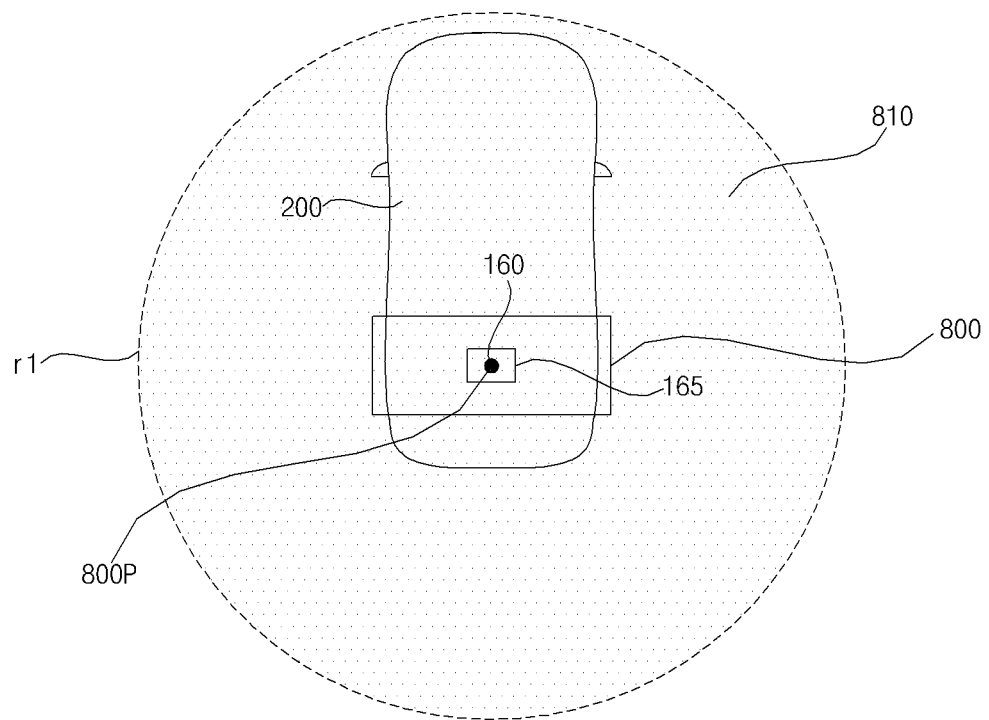

After movement of the vehicle, the processor may generate a vehicle movement direction signal or a guide signal to adjust the position of the vehicle based on the magnetic field as shown in FIGS. 11B to 11D. FIGS. 11B to 11D correspond to FIGS. 8B to 8D, respectively, and, therefore, a detailed description thereof will be omitted merely for convenience.

Meanwhile, the method of operating the vehicle charge assistance device and the vehicle according to the present disclosure may be implemented as code that can be written on a processor-readable recording medium and thus read by a processor provided in the vehicle charge assistance device or the vehicle. The processor-readable recording medium may be any type of recording device in which data is stored in a processor-readable manner. The processor-readable recording medium may include, for example, a read only memory (ROM), a random access memory (RAM), a compact disc read only memory (CD-ROM), a magnetic tape, a floppy disc, and an optical data storage device and may be implemented in the form of a carrier wave transmitted over the Internet. The processor-readable recording medium can be distributed over a plurality of computer systems connected to a network such that processor-readable code is written thereto and executed therefrom in a decentralized manner.

As broadly described and embodied herein, a vehicle charge assistance device and a vehicle including the same provides various advantages over prior devices. It is an object of the present disclosure to provide a vehicle charge assistance device that enables a vehicle to easily and conveniently move to a charge system and a vehicle including the same.

It is another object of the present disclosure to provide a vehicle charge assistance device that is capable of adjusting the position of a vehicle based on a magnetic field from a charge system after the vehicle is moved based on an image and a vehicle including the same.

In accordance with an aspect of the present disclosure, the above and other objects can be accomplished by the provision of a vehicle charge assistance device which may include at least one camera mounted at a vehicle, an antenna to receive a magnetic field from a charge system, and a processor to generate a vehicle movement direction signal based on a charge-related object in an image from the at least one camera and to generate a guide signal to adjust a position of the vehicle based on the magnetic field after movement of the vehicle according to the vehicle movement direction signal.

In accordance with another aspect of the present disclosure, there is provided a vehicle which may include a steering drive unit to drive a steering apparatus, a brake drive unit to drive a brake apparatus, a power source drive unit to drive a power source, at least one camera mounted at the vehicle, an antenna to receive a magnetic field from a charge system, a battery configured to be charged with electric power from the charge system according to a wireless charging signal received from the charge system, and a processor to generate a vehicle movement direction signal based on a charge-related object in an image from the at least one camera and to generate a guide signal to adjust a position of the vehicle based on the magnetic field after movement of the vehicle according to the vehicle movement direction signal, wherein at least one selected from among the steering drive unit, the brake drive unit, and the power source drive unit is operated based on the vehicle movement direction signal or the guide signal.

Consequently, it is possible to easily and conveniently move the vehicle to the charge system. In particular, the vehicle is moved based on the image and then the position of the vehicle is adjusted based on the magnetic field from the charge system, thereby improving user convenience.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vehicle charge assistance device comprising:
   at least one camera mounted on a vehicle;
   an antenna to detect a magnetic field from a charging device; and
   a processor to control a movement of the vehicle using at least one signal from the at least one camera or the antenna,
   wherein a first signal is generated to control movement of the vehicle when the vehicle is positioned greater than or equal to a prescribed distance from the charging device and a second signal is generated to control movement of the vehicle when the vehicle is positioned within the prescribed distance from the charging device, the first signal being different than the second signal,
   wherein the first signal is generated based on an image associated with the charging device from the at least one camera and the second signal is generated based on the magnetic field to control movement of the vehicle,
   wherein after the vehicle is moved based on the first signal, the antenna is activated when an intensity of the magnetic field is greater than or equal to a prescribed level, wherein after the vehicle is moved based on the second signal, the processor generates a third signal to adjust a position of the vehicle based on the magnetic field, wherein the processor recognizes a first object of the charging device and a second object of a guide member to guide movement of the vehicle to the charging device in the image from the at least one camera, and generates the first signal based on the first object of the charging device and the second object of a guide member, wherein the processor combines images from a front view camera, a rear view camera, a left side view camera, and a right side view camera to generate an around view image, wherein the processor controls to generate a plurality of vehicle movement directions, to display on a display the plurality of a vehicle movement path on the around view image, an image representing a battery on the vehicle, information regarding a distance between the battery and the charging device, or information regarding a direction of movement of the vehicle together with the vehicle movement path.

2. The vehicle charge assistance device according to claim 1, wherein
the processor determines an optimal direction of movement of the vehicle toward the charging device based on the magnetic field and generates the second signal based on the determined optimal direction of movement to control movement of the vehicle.

3. The vehicle charge assistance device according to claim 1, wherein
the processor determines an optimal direction of movement of the vehicle toward the charging device when movement is controlled by the magnetic field, and
when a direction of movement of the vehicle corresponding to the first signal is identical to the optimal direction of movement, the second signal including distance information is generated to adjust the position of the vehicle.

4. The vehicle charge assistance device according to claim 1,
wherein, when the object is not detected in the image, the processor generates the first signal including direction information based on the magnetic field and generates the second signal to adjust the position of the vehicle based on the magnetic field after movement of the vehicle according to the direction information in the first signal.

5. The vehicle charge assistance device according to claim 1, further comprising:
at least one ultrasonic sensor, wherein
when an object associated with the charging device is not detected in an image from the at least one camera, the processor generates the first signal including direction information based on signals from the at least one ultrasonic sensor, and generates the second signal to adjust the position of the vehicle based on the magnetic field after movement of the vehicle according to direction information in the first signal.

6. The vehicle charge assistance device according to claim 1, wherein the processor generates the first signal to include direction information to move the vehicle such that a front view camera disposed at a front of the vehicle is directed toward a central region of the charging device.

7. The vehicle charge assistance device according to claim 1, wherein the processor generates the first signal to include direction information based on at least one of a central region of the charging device, a width of the vehicle, or a length of the vehicle.

8. The vehicle charge assistance device according to claim 1, wherein the processor generates an optimal direction of vehicle movement based on a relative position of a battery in the vehicle to a position of the charging device.

9. The vehicle charge assistance device according to claim 1, wherein the processor generates the first signal based on an image associated with the charging device in the around view image, and
wherein the processor controls to display on a display at least one of a vehicle movement path on the around view image, an image representing a battery on the vehicle, information regarding a distance between the battery and the charging device, or information regarding a direction of movement of the vehicle together with the vehicle movement path.

10. The vehicle charge assistance device according to claim 1, further comprising:
an output unit to output a notification message upon completion of movement of the vehicle to the charging device; and
a communication unit to transmit a charging start signal to the charging device upon completion of movement of the vehicle to the charging device and to transmit a charging end signal to the charge system upon completion of charging.

11. The vehicle charge assistance device according to claim 1, further comprising:
a communication unit to exchange data with an external device; and
a display unit,
wherein the processor controls at least one of billing information, charge amount information, or chargeable time information from the charging device received through the communication unit to be displayed on the display unit.

12. A vehicle comprising:
a steering drive unit to drive a steering apparatus;
a brake drive unit to drive a brake apparatus;
a power source drive unit to drive a power source;
at least one camera mounted on the vehicle;
an antenna to detect a magnetic field from a charging device;
a battery configured to be wirelessly charged by the charging device; and
a processor to generate control signals to control movement of the vehicle,
wherein a first signal is generated to control movement of the vehicle when the vehicle is positioned greater than or equal to a prescribed distance from the charging device and a second signal is generated to control movement of the vehicle when the vehicle is positioned within the prescribed distance from the charging device, the first signal being different than the second signal,
wherein the first signal is generated based on an image associated with the charging device from the at least one camera and the second signal is generated based on the magnetic field to control movement of the vehicle,
wherein after the vehicle is moved based on the first signal, the antenna is activated when an intensity of the magnetic field is greater than or equal to a prescribed level, wherein after the vehicle is moved based on the second signal, the processor generates a third signal to adjust a position of the vehicle based on the magnetic field, wherein the processor recognizes a first object of the charging device and a second object of a guide member to guide movement of the vehicle to the charging device in the image from the at least one camera, and generates the first signal based on the first object of the charging device and the second object of a guide member, wherein the processor combines images from a front view camera, a rear view camera, a left side view camera, and a right side view camera to generate an around view image, wherein the processor controls to generate a plurality of vehicle movement directions, to display on a display the plurality of a vehicle movement path on the around view image, an image representing a battery on the vehicle, information regarding a distance between the battery and the charging device, or information regarding a direction of movement of the vehicle together with the vehicle movement path, and wherein at least one of the steering drive unit, the brake drive unit, or the power source drive unit is operated based on the first signal based on the image or the second signal based on the magnetic field.

13. The vehicle according to claim 12, further comprising:
a communication unit to exchange data with an external device; and
a display unit,
wherein the processor controls at least one of billing information, charge amount information, or chargeable time information from the charging device received through the communication unit to be displayed on the display unit.

* * * * *